United States Patent
Shukla et al.

(10) Patent No.: US 12,086,591 B2
(45) Date of Patent: Sep. 10, 2024

(54) DEVICE, METHOD AND SYSTEM TO PREDICT AN ADDRESS COLLISION BY A LOAD AND A STORE

(71) Applicant: Intel Corporation, Santa Clara, CA (US)

(72) Inventors: Sudhanshu Shukla, Bengaluru (IN); Jayesh Gaur, Bangalore (IN); Stanislav Shwartsman, Haifa (IL); Pavel I. Kryukov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 17/214,698

(22) Filed: Mar. 26, 2021

(65) Prior Publication Data

US 2022/0308876 A1    Sep. 29, 2022

(51) Int. Cl.
G06F 9/22 (2006.01)
G06F 9/30 (2018.01)
G06F 9/38 (2018.01)

(52) U.S. Cl.
CPC ........ G06F 9/30043 (2013.01); G06F 9/3856 (2023.08)

(58) Field of Classification Search
CPC ............................ G06F 9/30043; G06F 9/3856
See application file for complete search history.

(56) References Cited

U.S. PATENT DOCUMENTS

| | | | |
|---|---|---|---|
| 7,434,031 B1 * | 10/2008 | Spracklen | G06F 9/3838 712/217 |
| 8,549,263 B2 | 10/2013 | Krimer et al. | |
| 9,244,827 B2 | 1/2016 | Kim et al. | |
| 9,619,750 B2 | 4/2017 | Kim et al. | |
| 9,870,209 B2 | 1/2018 | Kelm et al. | |
| 9,891,915 B2 | 2/2018 | Abdallah et al. | |
| 10,402,263 B2 | 9/2019 | Sperber et al. | |

(Continued)

OTHER PUBLICATIONS

Chrysos, George Z. et al., "Memory Dependence Prediction Using Store Sets", 25th Annual International Symposium on Computer Architecture, 1998, pp. 142-153.

(Continued)

*Primary Examiner* — Cheng Yuan Tseng
(74) *Attorney, Agent, or Firm* — Essential Patents Group, LLP

(57) ABSTRACT

Techniques and mechanisms for determining a relative order in which a load instruction and a store instruction are to be executed. In an embodiment, a processor detects an address collision event wherein two instructions, corresponding to different respective instruction pointer values, target the same memory address. Based on the address collision event, the processor identifies respective instruction types of the two instructions as an aliasing instruction type pair. The processor further determines a count of decisions each to forego a reversal of an order of execution of instructions. Each decision represented in the count is based on instructions which are each of a different respective instruction type of the aliasing instruction type pair. In another embodiment, the processor determines, based on the count of decisions, whether a later load instruction is to be advanced in an order of instruction execution.

20 Claims, 22 Drawing Sheets

(56) References Cited

U.S. PATENT DOCUMENTS

| | | |
|---|---|---|
| 10,474,375 B2 | 11/2019 | Fleming, Jr. et al. |
| 10,719,355 B2 | 7/2020 | Roy et al. |
| 10,754,655 B2 | 8/2020 | Chauhan et al. |
| 10,761,844 B2 | 9/2020 | Shevgoor et al. |
| 2010/0095151 A1* | 4/2010 | Kobayashi ............ G06F 9/3836 711/E12.001 |
| 2011/0154116 A1* | 6/2011 | Alexander ............ G06F 9/3834 714/E11.029 |
| 2014/0281408 A1* | 9/2014 | Zeng .................... G06F 9/3834 712/216 |
| 2015/0205605 A1 | 7/2015 | Abdallah |
| 2020/0133679 A1 | 4/2020 | Brandt et al. |

OTHER PUBLICATIONS

Onder, Soner et al., "Dynamic Memory Disambiguation in the Presence of Out-of-order Store Issuing", Proceedings of the 32nd Annual ACM/IEEE International Symposium on Microarchitecture, 1999, pp. 170-176.

* cited by examiner

Load Color Cache 400

Store Color Cache 450

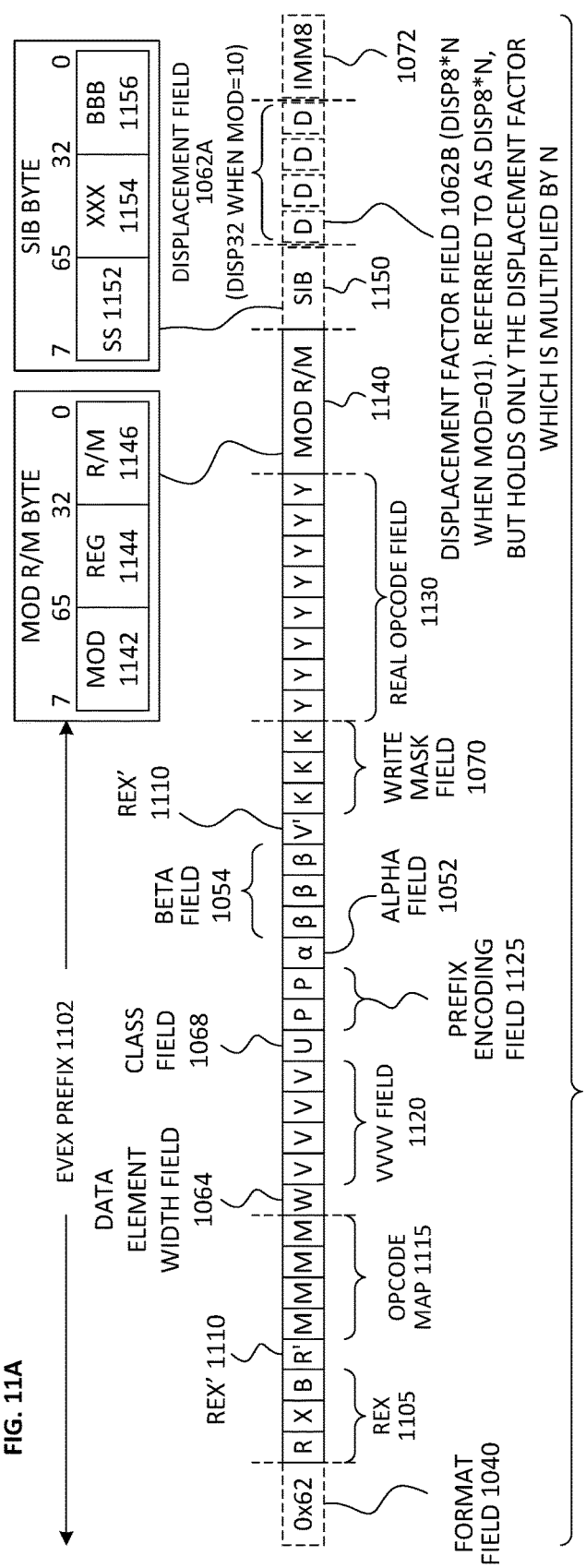
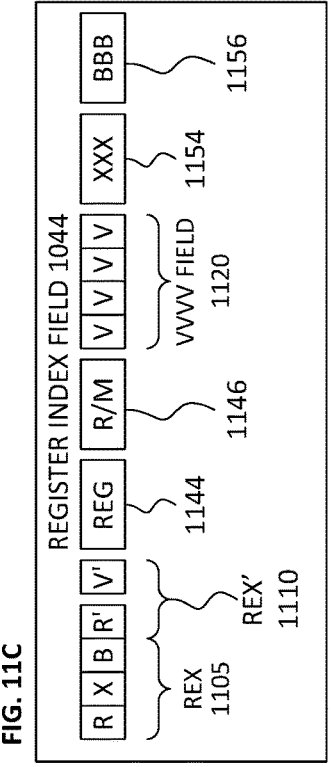
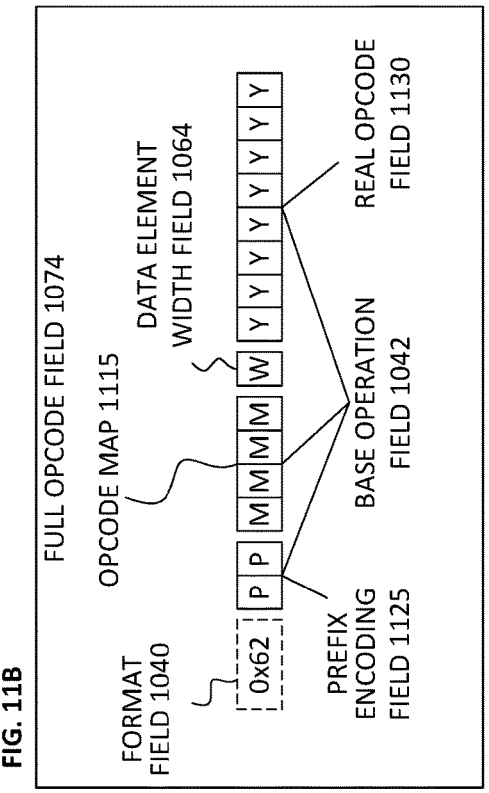

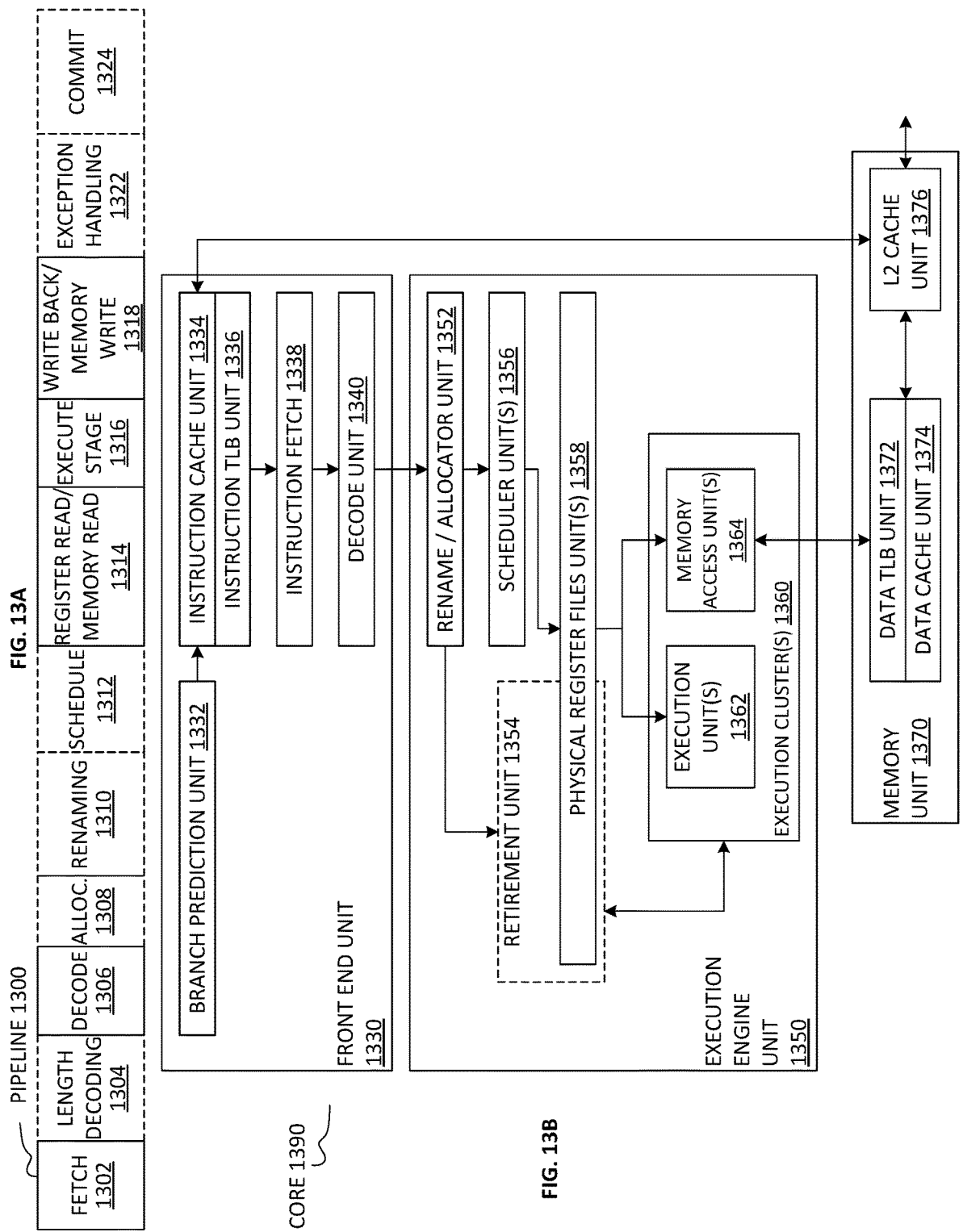

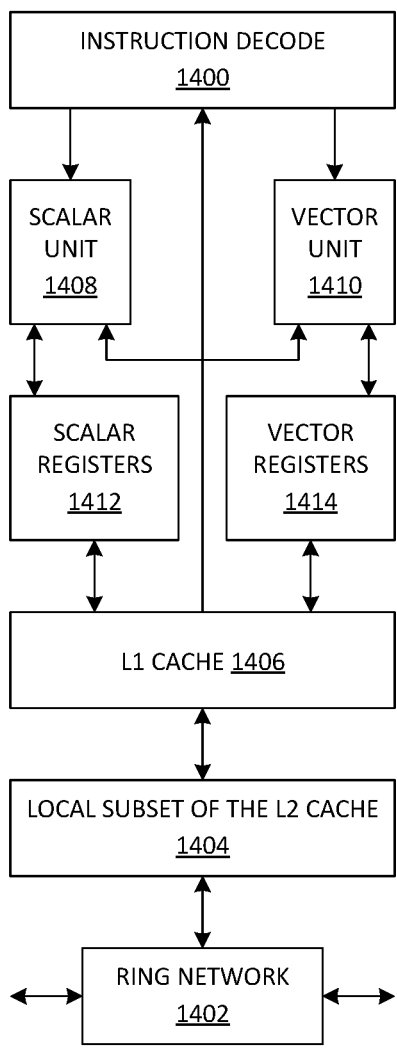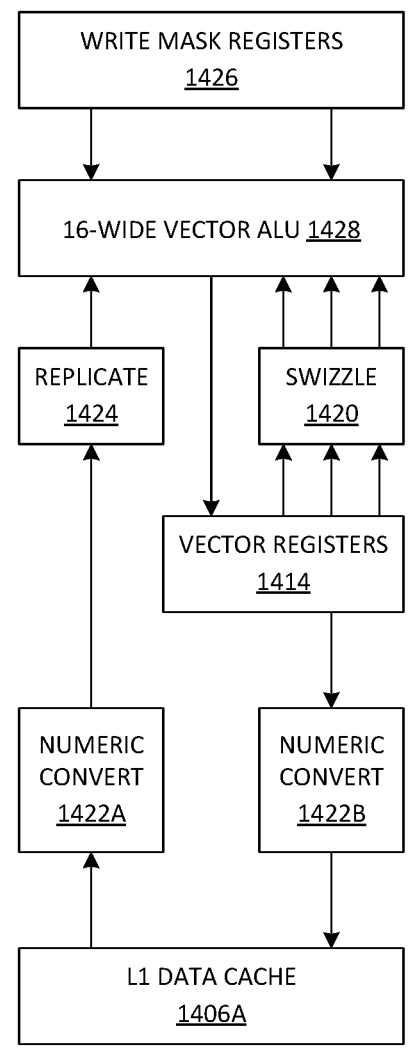
FIG. 14A
FIG. 14B

DEVICE, METHOD AND SYSTEM TO PREDICT AN ADDRESS COLLISION BY A LOAD AND A STORE

BACKGROUND

1. Technical Field

This disclosure generally relates to processing devices and more particularly, but not exclusively, to store address prediction for memory disambiguation in a processing device.

2. Background Art

In some microprocessors or processing systems, information (data or instructions) is accessed by a microprocessor using operations such as "load" operations or "store" operations. Furthermore, load and store operations are performed in response to an instruction (or sub-instruction, such as a micro-operation, or "uop") being executed by a processor.

When a load-from-memory operation (referred to as a "load micro-operation" or "load uop" in certain processor nomenclatures) is dispatched for execution in a pipelined processor, it typically checks against older, in-flight, store-to-memory operations ("store uops") in a store buffer of the processor. This check is performed because of the possibility of an older store uop in the store buffer with a matching memory address to the load uop that have not yet written their data into a memory hierarchy that is accessed by the processing device. If there is such a matching store, the load uop either, in general, forwards from the youngest older matching store uop or waits until the store uop is completed. This address checking process against older store uops for possible dependency is commonly referred to as memory disambiguation.

To promote efficient software performance, some modern processors speculatively issue instructions out-of-order for execution. As loads tend to appear on a programs critical execution path, it is desirable for such a processor to issue loads as soon as their addresses are available. However, to facilitate correct program execution, a given load typically should not bypass the youngest of the preceding stores that access the same memory location as that load. To accommodate this constraint, a load on issue is usually compared to any preceding store in a scheduler window to locate the youngest preceding store with a matching address. Usually, the question of whether a load matches a preceding store is only accurately determined after addresses of all the preceding stores have become available. Thus, when a load is otherwise ready to issue (but for an address being unavailable for some preceding store), the load is either stalled for possible later issuance when the store address becomes available, or—on the assumption that the load and the store will target different addresses—is advanced in the execution order to bypass the preceding store.

As successive generations of processor technologies continue to scale in size and operating frequency, there is expected to be an increasing premium placed on improvements to how information is variously loaded from and stored to memory.

BRIEF DESCRIPTION OF THE DRAWINGS

The various embodiments of the present invention are illustrated by way of example, and not by way of limitation, in the figures of the accompanying drawings and in which:

FIGS. 11A through 11D are block diagrams illustrating an exemplary specific vector friendly instruction format according to embodiments of the invention;

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention;

FIGS. 14A through 14B illustrate a block diagram of a more specific exemplary in-order core architecture, which core would be one of several logic blocks (including other cores of the same type and/or different types) in a chip;

DETAILED DESCRIPTION

Figure 1:
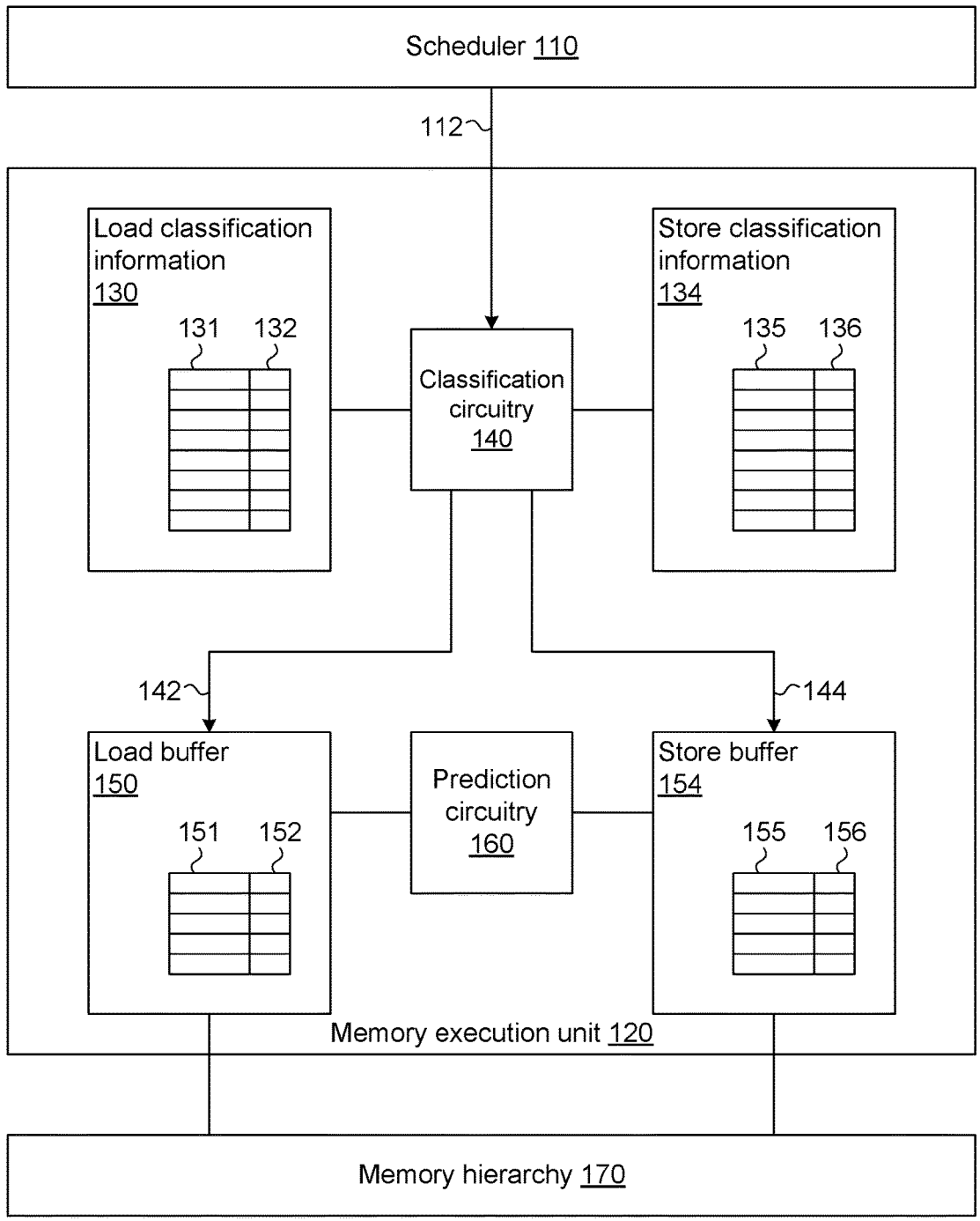
FIG. 1 shows a functional block diagram illustrating features of a processor to provide memory disambiguation functionality according to an embodiment.

Embodiments discussed herein variously provide techniques and mechanisms for determining whether a processor is to reverse a relative order in which a load instruction and a store instruction are to be executed. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which supports address prediction functionality as described herein.

Some embodiments variously provide out-of-order execution functionality which is to determine whether an order in which a load instruction and a store instruction are to be executed is to be different than some predefined execution order. Such embodiments variously identify a given one of said instructions as being of a particular type ("instruction type") which, for example, corresponds to a particular value of an instruction pointer ("instruction pointer value"). For example, a predefined execution order is indicated by a sequence of values each of a respective instruction pointer, where a given instruction type corresponds to a particular instruction pointer value in the sequence. Instructions of the same instruction type are subject to having different respective values of a given operand (e.g., including a memory address operand).

Unless otherwise indicated, "load instruction type" (or "load type," for brevity) refers herein to a type of load instruction, wherein each load instruction of a given load instruction type corresponds to the same first instruction pointer value. For example, load instructions of the same load instruction type—the load instructions variously executed at different times—are subject to having respective memory address operand values which target different memory addresses (or alternatively, the same memory address). A given memory address, for example, is to target a location in a memory resource such as a cache memory or, for example, a main memory (or "source memory").

Similarly, unless otherwise indicated, "store instruction type" (or "store type," for brevity) refers herein to a type of store instruction, wherein each store instruction of a given store instruction type corresponds to the same second instruction pointer value. For example, store instructions of the same store instruction type are subject to having respective memory address operand values which target different memory addresses (or alternatively, the same memory address).

The term "address collision" refers herein to a type of event wherein two instructions—e.g., including a load instruction and a store instruction—each target the same memory address. For example, an address collision is indicated by a data forwarding event wherein, before a load instruction has been executed, a store instruction is identified an execution unit of a processor as targeting the same memory address. The term "data forwarding" refers to the practice of a processor providing a version of the data from the store instruction to serve as the payload for the load instruction—i.e., where execution of the load is performed without requiring the data to be retrieved from the memory address. Additionally or alternatively, an address collision is indicated by a memory order violation which results from an improper execution of a load instruction prior to a store instruction which targets the same memory address.

As used herein, "aliasing" refers to the characteristic of different types of instructions tending to both be involved in address collisions. For example, in some embodiments, two instruction types (also referred to as an "instruction type pair") are determined to be aliasing, with respect to each other, where it is indicated, according to some predefined criteria, that respective instructions of the two instruction types tend to target the same memory address. By contrast, an instruction type pair is determined to be non-aliasing, with respect to each other, where it is indicated, according to some predefined criteria, that respective instructions of the two instruction types tend to target different memory addresses.

Two instruction types which are determined to be aliasing with each other are referred to herein as an "aliasing instruction type pair," whereas "aliasing instruction pair" refers herein to two instructions which are each of a different respective instruction type of an aliasing instruction type pair. As used herein, "aliasing load-store type pair" refers to a combination of a load instruction type and a store instruction type which are determined to be aliasing with each other. As used herein, "aliasing load-store pair" refers to a combination of a load instruction and a store instruction which are each of a different respective instruction type of the same aliasing load-store type pair. It is to be noted that the instructions of a given aliasing load-store pair do not necessarily target the same memory address, but are expected—by virtue of their respective instruction types—to have an increased likelihood of targeting the same address.

As used herein in the context of instruction execution, "bypass," "bypassing" and related terms variously refer to the characteristic of some first instruction being executed before a second instruction, where—but for said bypassing—the first instruction would instead be executed after the second instruction (according to some predefined execution order). For example, unless otherwise indicated, "load bypass" refers herein to a reversal of a predefined order in which a load instruction and a store instruction are to executed relative to each other. Some embodiments variously facilitate the selective performance of a load bypass wherein the execution of a load instruction is advanced, in an out-of-order instruction sequence, to take place before the execution of a store instruction. Such bypassing thus reverses a relative order of execution of a load-store instruction pair.

In various embodiments, an evaluation as to whether or not an instruction bypass is to take place (referred to herein as a "bypass evaluation") is performed based at least in part to a determination that a memory address operand of a store instruction has yet to be determined, while a load instruction is ready for execution (e.g., wherein a memory address operand of the load instruction is known). Alternatively or in addition, a bypass evaluation comprises identifying the load instruction and the store instruction as being an aliasing load-store pair. In some instances, a bypass evaluation results in a decision (referred to herein as a "bypass prevention decision") to forego the bypass under consideration. A bypass prevention decision is considered to be "good" where it is subsequently determined that the two instructions in question did actually target the same memory address. By contrast, a bypass prevention decision is considered to be "bad" where it is subsequently determined that the two instructions in question targeted different memory addresses.

In various embodiments, a bypass evaluation is performed based on a count of bad bypass prevention decisions—e.g., wherein each bad bypass prevention decision represented in the count was based on an aliasing of the same instruction type pair. In one such embodiment, performance of such a bypass evaluation is further based on a count of good bypass prevention decisions—e.g., wherein each good bypass prevention decision represented in the count was based on a respective instruction of the same load instruction type.

FIG. 1 shows features of a processor 100 to provide address prediction functionality according to an embodiment. Processor 100 illustrates one example of an embodiment which determines whether a load bypass is to be performed, where the determination is based on a count of decisions each to forego a respective load bypass. In various implementations, processor 100 is an out-of-order processor.

As illustrated in FIG. 1, processor 100 is any of a variety of single core, or multicore, processors which include one or more execution units each to perform a respective one or more algorithms for process data. In general, a given core of processor 100 includes a memory execution unit 120 (for example) which generally takes the form of a processor pipeline. Such a pipeline comprises a plurality of stages including (for example) one or more front end units, one or more execution units, and one or more backend units. A given core of processor 100 supports one or more instructions sets such as the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., a RISC-V instruction set, or the like. It should be understood that, in some embodiments, a processor core supports multithreading—i.e., executing two or more parallel sets of operations or threads—and (for example) does so in any of a variety of ways including time sliced multithreading, simultaneous multithreading (where a single physical core provides a logical core for each of the threads that physical core is simultaneously multithreading), or a combination thereof (e.g., time sliced fetching and decoding combined with simultaneous multithreading thereafter such as in the Intel® Hyperthreading technology).

In one example embodiment, processor 100 is a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, processor 100 is from another company, such as ARM Holdings, Ltd, MIPS, etc. In other embodiments, processor 100 is a special-purpose processor, such as, for example, a network or communication processor, compression engine, graphics processor, co-processor, embedded processor, or the like. In various embodiments, processor 100 is implemented on one or more chips. Alternatively, or in addition, processor 100 is a part of and/or implemented on one or more substrates using any of a number of process technologies, such as, for example, BiCMOS, CMOS, or NMOS. In some embodiments, a system on a chip (SoC) includes processor 100.

Processor 100 comprises a scheduler 110 and a memory execution unit 120 which is coupled thereto. Scheduler 110 comprises circuitry (including, for example, any of various suitable state machines, application specific integrated circuits, programmable gate arrays, or the like) which is to provide to memory execution unit 120 a stream 112 of instructions based on executable code—e.g., wherein scheduler 110 determines a sequence of instructions in stream 112 according to, or otherwise based on, a logical program order of the executable code. In an embodiment, various instructions in stream 112 are each to represent an execution instance of a corresponding executable instruction of such code—e.g., where a given instruction in stream 112 corresponds to a respective instruction pointer value (i.e., the value of a given instruction pointer when it is points to the corresponding executable instruction). In various embodiments, the providing of stream 112 includes operations which, for example, are adapted from instruction scheduling techniques of various conventional processors.

Memory execution unit 120 comprises circuitry to variously implement an execution of instructions received in stream 112. For example, memory execution unit 120 is part of an execution engine which supports (for example) memory operations—e.g., including "micro-operations" or "uops"—with processor 100. By way of illustration and not limitation, such memory operations include load operations that load data from a memory hierarchy 170 which is included in (or alternatively, coupled to) processor 100, and store operations that store data to the memory hierarchy 170. Although not specifically illustrated, the memory hierarchy 170 includes (for example) one or more cache levels—e.g., comprising a L1 cache, L2 cache, L3 cache, etc.—and/or a system memory.

In various embodiments, some instructions of stream 112 each comprise a respective one or more operands, the values of which have yet to be calculated or otherwise determined—e.g., wherein a memory address operand of a given store (or other) instruction is represented in stream 112 as a variable which needs to be subsequently evaluated. Memory execution unit 120 further includes or otherwise operates with circuitry (not shown) to determine such operand values to facilitate instruction execution—e.g., wherein the determining of such operand values includes operations adapted from instruction execution techniques of various conventional processors. Additionally or alternatively, the order in which some instructions of stream 112 are actually executed is subject to being changed (relative to the instruction sequence in stream 112) by memory execution unit 120—e.g., wherein said instructions are received provided via stream 112 in order—or alternatively, out-of-order—relative to the logical program order of the executable code.

Some embodiments provide address prediction for memory disambiguation by memory execution unit 120. Memory disambiguation, according to some embodiments, includes or is otherwise based on an address checking process for load operations against any older store operations in the same scheduler window (i.e., older with respect to a logical program order) for possible collisions. Address prediction in some embodiments includes or is otherwise based on monitoring to detect a tendency (or lack thereof) for instructions of one instruction type to target the same memory address as that targeted by an instruction of another instruction type. Based on such monitoring, circuitry of memory execution unit 120 predicts whether an address collision by such instructions will take place. This prediction is used to effectuate load bypasses for increased efficiency of memory execution unit 120.

In the example embodiment shown memory execution unit 120 includes, is coupled to, or otherwise has access to classification circuitry 140 which variously tags instructions of stream 112—e.g., to generate tagged load instructions 142 which are buffered to respective locations of a load buffer 150, and tagged store instructions 144 which are buffered to respective locations of a store buffer 154. For example, a given load instruction 151 is buffered to load buffer 150 in association with a corresponding tag 152, while a given store instruction 155 is buffered to store instruction 155 in association with a corresponding tag 156.

Classification circuitry 140 includes or otherwise has access to reference information which specifies or otherwise indicates that a given two instruction types—e.g., including a load instruction type and a store instruction type—are an aliasing instruction type pair. In one example embodiment, such reference information—e.g., provided with any of a variety of arrangements of one or more tables, linked lists, caches, registers and/or other suitable circuit resource—includes the illustrative load classification information 130 and classification circuitry 140 shown. Load classification information 130 comprises entries which each correspond to a different respective load instruction type. A given entry of load classification information 130 comprises a respective index 131 which specifies or otherwise indicates the corresponding load instruction type (e.g., wherein the respective index 131 is equal to, or otherwise based on, a corresponding instruction pointer value). Furthermore, store classification information 134 comprises entries which each correspond to a different respective store instruction type. A given entry of store classification information 134 comprises a respective index 135 which, similar to index 131, specifies or otherwise indicates the corresponding store instruction type. Indices 131, 135 are one example of a mechanism by which, in some embodiments, classification circuitry 140 to is able to search reference information, based on the instruction pointer value for a given instruction in stream 112, to determine a color with which that instruction is to be tagged. In various instances, such tagging facilitates a later determination as to whether a load bypass is to take place.

By way of illustration and not limitation, a given entry of load classification information 130 further comprises one or more fields 132 to provide a color value which is currently assigned to the corresponding load instruction type. Similarly, a given entry of store classification information 134 further comprises one or more fields 136 to provide a color value which is currently assigned to the corresponding store instruction type. As described herein, the assigning of a color value to a given instruction type is based on the detection of an address collision event involving an instruction of that instruction type.

In some embodiments, the reference information further provides one or more counts of bad bypass prevention decisions, where each count corresponds to a respective load instruction type (and, for example, further corresponds to a respective store instruction type). By way of illustration and not limitation, for a given entry of load classification information 130, one or more fields 132 of that entry provide an up-to-date count of bad bypass prevention decisions, where said count is specific to both the corresponding load instruction type, and to a store instruction type which is currently aliasing with that load instruction type. As described herein, the tagging of a given load instruction, in some embodiments, is based on the current count of bad bypass prevention decisions for the instruction type of that load instruction.

Prediction circuitry 160 of processor 100 is further implemented within memory execution unit 120 in accordance with one embodiment. Prediction circuitry 160 is operable to perform, as described herein, a prediction of address collision for memory disambiguation according to some embodiments. In various embodiments, such prediction includes or is otherwise based on a determination of whether a given instruction is of any instruction type in an aliasing instruction type pair. For example, where a given two instructions 151, 155—in load buffer 150 and store buffer 154 (respectively)—are of respective instruction types which are aliasing with each other, aliasing is indicated by the respective tags 152, 156 for said two instructions 151, 155 being equal to each other. To determine whether a given load instruction is available to be advanced in the execution order, prediction circuitry 160 searches tags at store buffer 154 to look for a buffered store instruction (if any) which, by virtue of sharing a common tag with the load instruction, imposes a limit the on how far ahead the load instruction is to be advanced.

Figure 2:
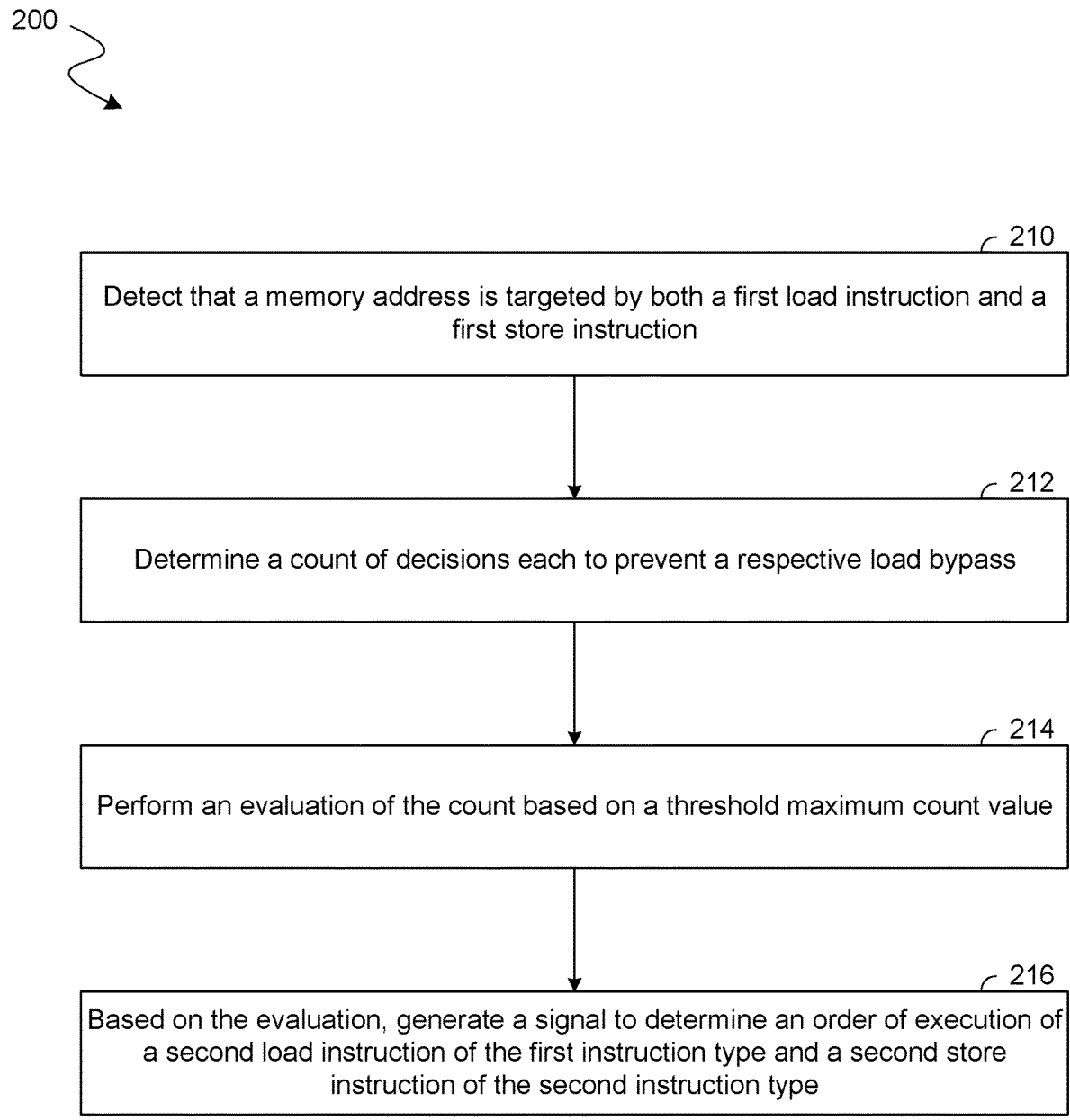
FIG. 2 shows a flow diagram illustrating features of a method to operate memory disambiguation circuitry of a processor according to an embodiment.

FIG. 2 shows features of a method 200 to operate memory disambiguation circuitry according to an embodiment. Method 200 illustrates one example of an embodiment wherein operations at a processor determine, based on a count of bad bypass prevention decisions, a relative order in which two instructions are to be executed. Operations such as those of method 200 are performed, for example, with circuitry of memory execution unit 120.

As shown in FIG. 2, method 200 comprises (at 210) detecting that a memory address is targeted by both a first load instruction and a first store instruction. In some embodiments, the detecting at 210 includes determining that the first load instruction and the first store instruction are of a first instruction type and a second instruction type (respectively)—e.g., wherein the first instruction type and the second instruction type correspond to different respective instruction pointer values. The detecting at 210 includes one or more operations adapted (for example) from conventional processor techniques to evaluate instruction execution.

In various embodiments, the detecting at 210 comprises detecting one of a data forwarding event or a memory order violation. By way of illustration and not limitation, the detecting at 210 comprises determining that a threshold minimum number of one or more address collision events has occurred, for example, in a predetermined period of time or a predetermined number of instructions—e.g., wherein each such address collision event is based on instructions which are each of a respective one of the first instruction type or the second instruction type.

Method 200 further comprises (at 212) determining, based on the detecting at 210, a count of decisions each to prevent a respective load bypass. For example, the determining at 212 updates, resets, receives, creates or otherwise determines a count of decisions, each of which is to forego an order of execution of a respective instruction of the first instruction type and a respective instruction of the second instruction type. In some embodiments, said count is a count of bad bypass prevention decisions—e.g., wherein, for each decision represented in said count, the respective instruction of the first instruction type and the respective instruction of the second instruction type are ultimately determined to have targeted different respective memory addresses.

In some embodiments, the determining at 212 comprises performing successive updated (e.g., increments) to the count as bypass prevention decisions are determined to be bad—e.g., where each decision is a result of a bypass evaluation that is preformed while a target address of a respective load instruction is known, but while a target address of a respective store instruction has yet to be determined. In one such embodiment, the determining at 212 comprises setting—e.g., resetting—the count to zero, or some other baseline count value, where a bypass prevention decision, corresponding to the same instruction type pair, is determined to be good.

Method 200 further comprises (at 214) performing an evaluation of the count based on a threshold maximum count value. For example, in some embodiments, method 200 further comprises assigning a first color to each of the first instruction type and the second instruction type, where such assigning is based on the detecting of an address collision at 210. In this particular context, "color" herein refers to a value which is to serve as a marker—e.g., to facilitate the identification of one instruction type as aliasing with another instruction type. In some embodiments, such a color is made available for use in tagging a given instruction—e.g., to indicate that said instruction belongs to an instruction type to which that color is currently assigned. In one such embodiment, the tagging of an instruction is based on the evaluation—e.g., wherein a decision to assign a given load instruction is assigned the first color or some other color (such as a reserved color) is conditioned upon whether, at the time, a corresponding count of bad bypass prevention decisions is less than the threshold maximum count value.

In one example embodiment, the threshold maximum count value is greater than one—e.g., where the value is equal to $2^n$ for some natural number n. By way of illustration and not limitation, such a threshold maximum count value is in a range of 2 to 128 (for example, in a range of 4 to 64 and, in some embodiments, in a range of 8 to 32). However, the particular value of the threshold maximum count varies significantly in different embodiments, according to implementation significant details.

Based on the evaluation performed at 214, method 200 (at 216) generates a signal to determine an order of execution of a second load instruction and a second store instruction which are of the first instruction type and the second instruction type (respectively).

For example, in some embodiments, method 200 further comprises identifying the respective instruction types of the second load instruction and the second store instruction—e.g., where the identifying is based on a first instruction pointer value and a second instruction pointer value (respectively) for the second load instruction and the second store instruction. In one such embodiment, reference information (e.g., including load classification information 130 and store classification information 134) is accessed, based on the identified instruction types, to determine that the first color is assigned to the first instruction type and to the second instruction type. The second load instruction and the second store instruction are variously tagged based on assignment and, for example, the evaluation performed at 214. Subsequently, the respective tags for the second load instruction and the second store instruction are evaluated to determine, for example, whether the second load instruction can be advanced past the second store instruction in an order of execution.

In some embodiments, method 200 comprises additional operations (not shown) to maintain and/or otherwise provide one or more other criteria—in addition to the count of decisions determined at 212—which, in various scenarios, are conditionally evaluated as an additional or alternative basis for generating the signal at 216. By way of illustration and not limitation, such additional operations comprise maintaining a count of good bypass prevention decisions— e.g., wherein each decision represented by said count corresponds to one (e.g., only one) load instruction type. In one such embodiment, said count of good bypass prevention decisions is non-specific with respect to any particular store instruction type or types. For example, each decision represented in such a count of good bypass prevention decisions is based on a respective load instruction of the same corresponding load instruction type—e.g., where the representation of that same decision in the count is independent of whether said decision is further based on a store instruction of any particular store instruction type.

Figure 3:
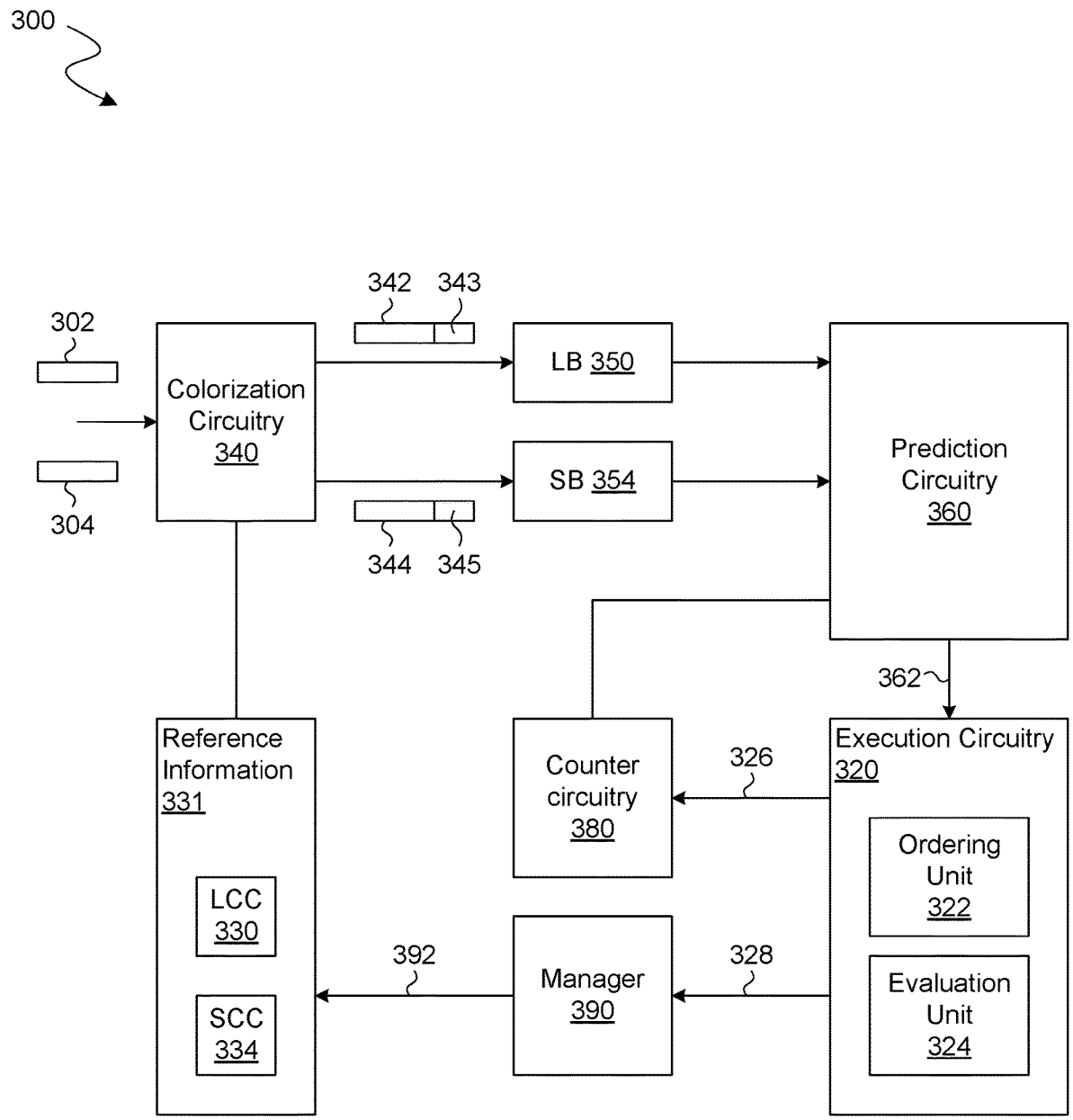
FIG. 3 shows a functional block diagram illustrating features of a processor to perform memory disambiguation according to an embodiment.

FIG. 3 shows features of a processor 300 to perform memory disambiguation according to an embodiment. The processor 300 illustrates one example of an embodiment wherein bypass prevention decisions are used to variously determine address prediction metrics including a count of bad bypass prevention decisions. In various embodiments, processor 300 provides functionality such as that of processor 100—e.g., wherein one or more operations of method 200 are performed with processor 300.

As shown in FIG. 3, processor 300 comprises a load color cache (LCC) 330, a store color cache (SCC) 334, colorization circuitry 340, a load buffer (LB) 350, a store buffer (SB) 354, and prediction circuitry 360 which—in some embodiments—correspond functionally to load classification information 130, store classification information 134, classification circuitry 140, load buffer 150, store buffer 154, and prediction circuitry 160 (respectively). Processor 300 further comprises execution circuitry 320, a manager 390, and (in some embodiments) counter circuitry 380 to facilitate execution of instructions in an order which is based on address prediction performed by prediction circuitry 360.

Manager 390 comprises circuitry to update or otherwise provide reference information 331 (including LCC 330 and SCC 334) which facilitates the tagging of a given instruction. Such reference information 331 is generated or otherwise accessed (for example) based on an indication of an address collision event—e.g., where said indication is provided via a signal 328 from execution circuitry 320 of processor 300.

Based on signal 328, manager 390 accesses reference information 331 to create, update or otherwise access an entry of LCC 330 and/or an entry of SCC 334. For example, manager 390 generates one or more signals (e.g., including the illustrative signal 392 shown) to assign one or more colors each to a respective entry of LCC 330 and/or to a respective entry of SCC 334. In some embodiments, signal 392 additionally or alternatively updates, resets or otherwise accesses a count of bad bypass decisions which (for example) is specific to a combination of a particular load instruction and a particular store instruction type. In one such embodiment, bad bypass decisions are indicated to manager 390 by signal 328 and/or other suitable communications received (for example) from execution circuitry 320 and/or prediction circuitry 360.

At a given time during operation of processor 300 (e.g., after manager 390 has variously provided LCC 330 and SCC 334 with respective entries each for a corresponding instruction type) colorization circuitry 340 receives instructions which, for example, are provided via stream 112. Such instructions include the illustrative load instruction 302 and store instruction 304 shown.

In one such embodiment, colorization circuitry 340 identifies load instruction 302 and store instruction 304 as corresponding, respectively, to a first instruction pointer value and a second instruction pointer value. Based on the first instruction pointer value, colorization circuitry 340 determines a first index to search LCC 330—e.g., wherein the first index is calculated as a hash of the first instruction pointer value. Furthermore, based on the second instruction pointer value, colorization circuitry 340 determines a second index to search SCC 334—e.g., wherein the second index is calculated as a hash of the second instruction pointer value.

Colorization circuitry 340 then searches LCC 330, based on the first index, to identify a first color which is assigned to the load instruction type to which load instruction 302 belongs. Colorization circuitry 340 further searches SCC 334, based on a second index, to identify a second color which is assigned to the store instruction type to which store instruction 304 belongs. Based on such searching, colorization circuitry 340 tags load instruction 302 with a color 343 to generate a tagged load instruction 342, and tags store instruction 304 with a SB 354 to generate a tagged store instruction 344. Subsequently, tagged load instruction 342 and tagged store instruction 344 are buffered to LB 350 and SB 354 (respectively).

Prediction circuitry 360 provides functionality to determine, for a given two instructions, whether—according to some predetermined criteria—said instructions are likely to target the same address. Such address prediction functionality facilitates the determining of a relative order in which some plurality of instructions are to be executed with execution circuitry 320.

For example, prediction circuitry 360 detects—based on the respective colors 343, 345 of tagged load instruction 342 in LB 350 and tagged store instruction 344 in SB 354—an indication of whether (or not) the respective instruction types of load instruction 302 and store instruction 304 are currently aliasing with each other. Based on such detecting, prediction circuitry 360 provides to execution circuitry 320 a signal 362 which specifies or otherwise indicates an order in which load instruction 302 and store instruction 304 are to be executed, relative to each other.

In one such embodiment, execution circuitry 320 comprises an ordering unit 322 to determine a bypass prevention decision indicated by signal 362, wherein execution circuitry 320 executes load instruction 302, and store instruction 304 according to an order determined by said decision. By way of illustration and not limitation, signal 362 sequentially provides load instruction 302 and store instruction 304 to execution circuitry 320 according to the order. Alternatively, signal 362 signals execution circuitry 320 to retrieve load instruction 302 and store instruction 304 from LB 350 and SB 354 (respectively) according to the order.

In various embodiments, execution circuitry 320 further includes, is coupled to or otherwise has access to circuitry (such as that of the illustrative evaluation unit 324 shown) to determine whether (or not) an execution of instructions during a given schedule window—e.g., the instructions including load instruction 302 and store instruction 304—contributed to an address collision event. Evaluation unit 324 (or, alternatively, manager 390 or other suitable circuitry of processor 300) further provides functionality to determine that said address collision event involved two instructions which were the subject of a bypass evaluation.

In one such embodiment, execution circuitry 320 provides to manager 390 a signal 328 which specifies or otherwise indicates (for example) the detection of an address collision event. In some embodiments, signal 328 further indicates an instance of a bad bypass prevention decision—e.g., wherein signal 328 identifies, for each of one or more instructions associated with the bad bypass prevention decision, a respective instruction type to which the instruction belongs.

Based on signal 328, manager 390 accesses reference information 331 to create, update or otherwise access an entry of LCC 330 and/or an entry of SCC 334. For example, manager 390 generates one or more signals (e.g., including the illustrative signal 392 shown) to assign one or more colors each to a respective entry of LCC 330 and/or to a respective entry of SCC 334. In some embodiments, signal 392 additionally or alternatively updates, resets or otherwise accesses a count of bad bypass prevention decisions which (for example) is specific to a combination of a particular load instruction and a particular store instruction type. In one such embodiment, bad bypass decisions are indicated to manager 390 by signal 328 and/or other suitable communications received (for example) from execution circuitry 320 and/or prediction circuitry 360.

Although some embodiments are not limited in this regard, prediction circuitry 360 determines, based on a count of bad bypass prevention decisions, whether (or not) a bypass evaluation is to be performed based on—or alternatively, independent of—a corresponding count of good bypass decisions. For example, execution circuitry 320 further comprises counter circuitry 380 which (for example) maintains, for each of one or more instruction types, a respective count of good bypass prevention decisions. In one such embodiment, some or all such counts each correspond to a respective one (e.g., only one) load instruction type—e.g., where each such count is generic with respect to store instruction type(s).

Good bypass decisions are indicated to counter circuitry 380 by a signal 326 and/or other suitable communications received (for example) from execution circuitry 320 and/or prediction circuitry 360. In one such embodiment, prediction circuitry 360 determines—e.g., based on colors 343, 345 (or other such instruction tag information)—whether to selectively access counter circuitry 380 to retrieve and evaluate a corresponding count of good bypass prevention decisions. In one embodiment, such evaluation includes prediction circuitry 360 comparing the count of good bypass prevention decisions with a threshold minimum count value.

Figure 4A:
FIGS. 4A, 4B show tables each illustrating respective features of reference information to facilitate memory disambiguation according to a corresponding embodiment.
Figure 4B:

FIGS. 4A, 4B show respective features of a load color cache (LCC) 400 and a store color cache (SCC) 450 to facilitate memory disambiguation each according to a corresponding embodiment. LCC 400 and SCC 450 each illustrate a respective embodiment wherein reference information (e.g., including load classification information 130 and/or store classification information 134) comprises entries which each correspond to a different respective instruction type. In some embodiments, such reference information is accessed to determine how a given load instruction, and/or a given store instruction, is to be tagged to facilitate address prediction. In various embodiments, LCC 400 and SCC 450 correspond functionally to LCC 330 and SCC 334—e.g., wherein one or more operations of method 200 are based on, or provide, an entry of LCC 400 and/or an entry of SCC 450.

As shown in FIG. 4A, LCC 400 comprises entries 410a, 410b, . . . , 410m which correspond to respective instruction pointer values La, Lb, . . . , Lm. In the illustrative embodiment shown, entries 410a, 410b, . . . , 410m each comprise a respective index field 420, recency field 421, color field 422, and count field 423.

Index field 420 facilitates functionality to search for a particular one of entries 410a, 410b, . . . , 410m—e.g., based on an instruction pointer value for a given load instruction. In one such embodiment, entries 410a, 410b, . . . , 410m are equal to the respective values La, Lb, . . . , Lm or, for example, are equal each to a hash of a different respective one of values La, Lb, . . . , Lm.

Recency field 421 facilitates functionality to age out or otherwise evict a given one of entries 410a, 410b, . . . , 410m from LCC 400—e.g., to select the given entry which is to be replaced with a new entry of LCC 400. By way of illustration and not limitation, the recency field 421 of a given one of entries 410a, 410b, . . . , 410m is to store a 1-bit Not Recently Used flag (or other suitable value) indicating whether some threshold period of time (or number of instructions, for example) has tolled since a most recent use of that entry to tag a load instruction.

Color field 422 is to store a value which represents the current color assigned to the load instruction type to which the entry in question corresponds (e.g., where the load instruction type corresponds to an instruction pointer value indicated by the index field 420 of said entry).

Count field 423 is to store a value which represents a current count of bypass prevention decisions—e.g., a count of decisions each to forego a reversal of an order of execution of a respective load instruction and a respective store instruction. In various embodiments, the count field 423 for a given LCC entry stores a value representing a count of bad bypass prevent decisions—i.e., decisions each to forego a respective load bypass, where it is ultimately determined that the respective load instruction and the respective store instruction target different memory addresses. In one such embodiment, for each such bad bypass prevent decision, the respective load instruction and the respective store instruction are each of a different respective instruction type of a same aliasing instruction type pair.

As shown in FIG. 4B, SCC 450 comprises entries 460a, 460b, . . . , 460n which correspond to respective instruction pointer values Sa, Sb, . . . , Sn. In the illustrative embodiment shown, entries 460a, 460b, . . . , 460n each comprise a respective index field 470, recency field 471, and color field 472. For example, index field 470, recency field 471, and color field 472 correspond functionally to index field 420, recency field 421, and color field 472. The particular number, format and arrangement of the entries 410a, 410b, . . . , 410m in LCC 400—and of the entries 460a, 460b, . . . , 460n in SCC 450—are merely illustrative, and not limiting on some embodiments. In other embodiments LCC 400 and/or SCC 450 comprise more, fewer and/or different fields to identify an aliasing instruction type pair and a count of bad bypass prevention decisions for that aliasing instruction type pair.

Figure 5:
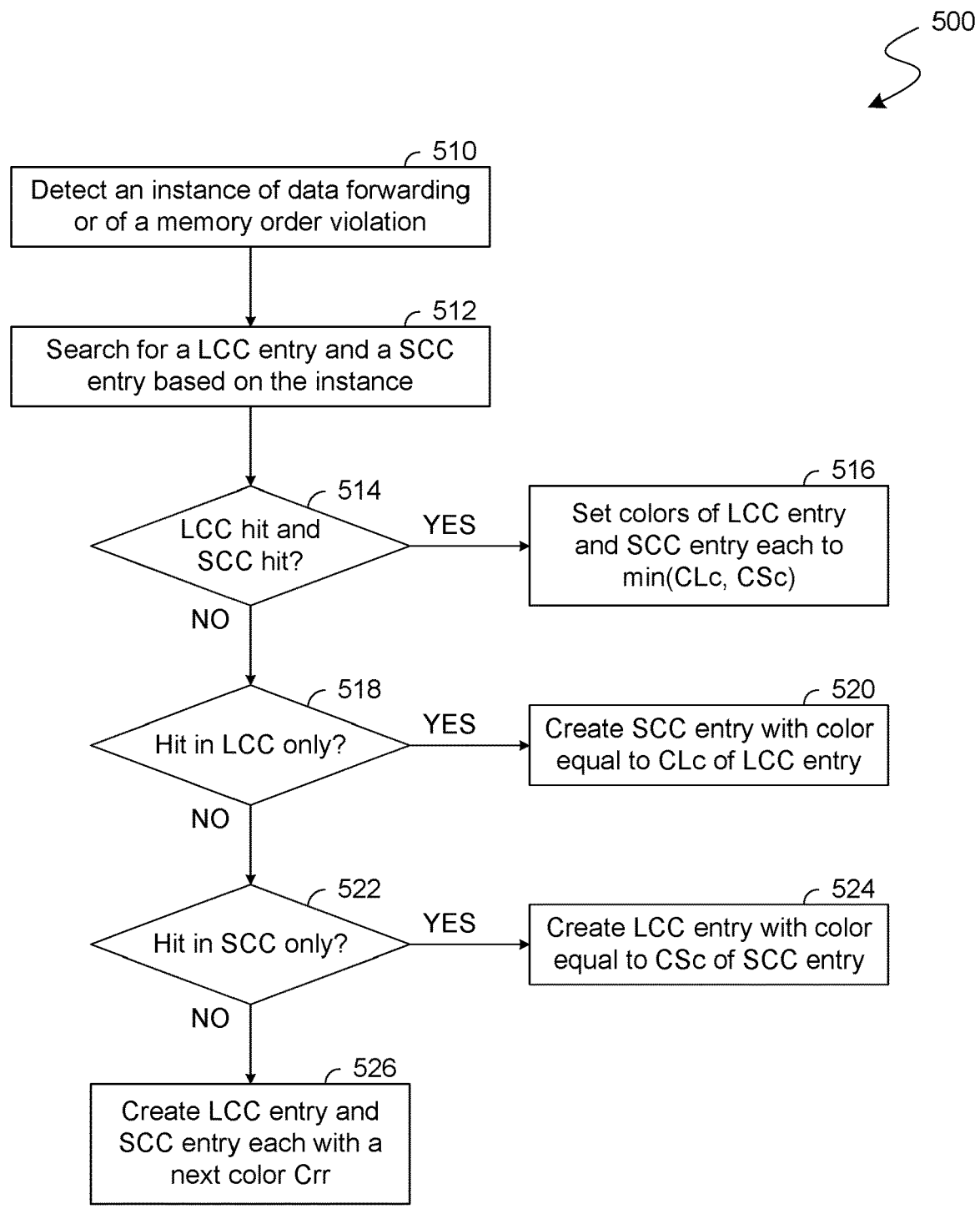
FIG. 5 shows a flow diagram illustrating features of a method to determine instruction classification information according to an embodiment.

FIG. 5 shows features of a method 500 to determine instruction classification information according to an embodiment. The method 500 illustrates one example of an embodiment wherein one or each of a LCC entry, or a SCC entry, is created, modified or otherwise accessed to indicate that a load instruction type is aliasing with a store instruction type. In various embodiments, operations such as those of method 500 are performed, for example, with manager 390. Alternatively or in addition, operations of method 200 include or are otherwise based on a determining of reference information according to method 500.

As shown in FIG. 5, method 500 comprises (at 510) detecting and instance of data forwarding or of a memory order violation—e.g., wherein two instructions target the same memory address. Method 500 further comprises (at 512) searching a load color cache and a store color cache based on the detected instance. By way of illustration and not limitation, the searching at 512 includes or is otherwise based on the determining of a first instruction pointer value and a second instruction pointer value for a load instruction and a store instruction (respectively) which were involved in a detected address collision event. Based on the first instruction pointer value and the second instruction pointer value, method 500 calculates or otherwise determines (respectively) a first index value to search the LCC, and a second index value to search the SCC. In one example embodiment, LCC 330 and SCC 334 (or load classification information 130 and store classification information 134, for example) are variously searched at 512.

Method 500 further determines whether or not the searching at 512 has hit respective entries of the LCC and the SCC (at 514), or hit only at an entry of the LCC (at 518), or hit only an entry of the SCC (at 522). The particular order and/or manner in which such determining is performed is merely illustrative, and not limiting on some embodiments.

Where it is determined at 514 that the search at 512 hit respective entries of the LCC and the SCC, method 500 (at 516) modifies one or both of the respective colors CLc, CSc which are assigned to the LCC entry and the SCC entry. In the example embodiment shown, a minimum value (min) of the currently-assigned colors CLc, CSc is used to determine a next color which is to be assigned—as necessary—to one of the LCC entry and the SCC entry (e.g., assuming the currently-assigned colors CLc, CSc are not equal to each other). Alternatively, a maximum value (max) of the currently-assigned colors CLc, CSc could be used to determine the next color, for example. In still another embodiment, the respective colors CLc, CSc are each changed to a new color value which, for example, is selected from a pool of available color values—e.g., according to a round robin scheme (or other suitable scheme).

Where it is determined at 518 that the search at 512 hit only at an entry of the LCC, method 500 (at 520) creates a SCC entry for the instruction type of the store instruction (e.g., the entry to be indexed based on the second instruction pointer value), and assigns to this new SCC entry a color CSc which is equal to the color CLc currently assigned to the load entry identified by the searching at 512.

Where it is determined at 522 that the search at 512 hit only an entry of the SCC (at 522), method 500 (at 524) creates a LCC entry for the instruction type of the load instruction (e.g., the entry to be indexed based on the first instruction pointer value), and assigns to this new LCC entry a color CLc which is equal to the color CSc currently assigned to the store entry identified by the searching at 512.

Where it is instead determined (e.g., at 522) that the search at 512 did not hit any entry of the LCC or the SCC, method 500 (at 526) creates both a LCC entry for the instruction type of the load instruction, and a SCC entry for the instruction type of the store instruction—e.g., the entries to be indexed based on (respectively) the first instruction pointer value and the second instruction pointer value. The respective colors CLc, CSs of the new LCC entry and SCC entry are assigned to the same color value Crr which is selected from a pool of available color values—e.g., according to a round robin scheme (or other suitable scheme).

Figure 6:
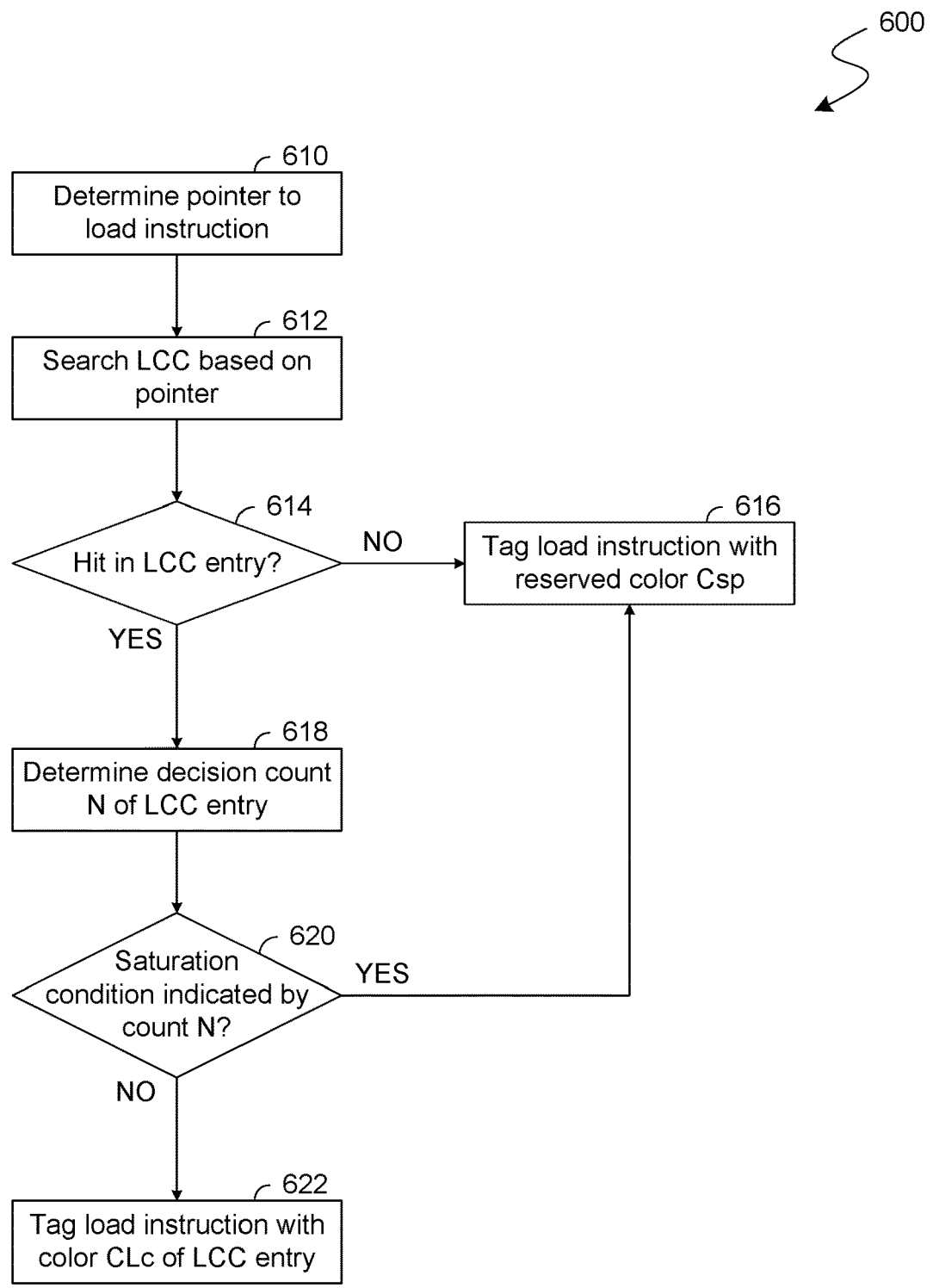
FIG. 6 shows a flow diagram illustrating features of a method to tag a load instruction with classification information according to an embodiment.

FIG. 6 shows features of a method 600 to tag a load instruction with classification information according to an embodiment. The method 600 illustrates one example of an embodiment wherein a load instruction is tagged with a first color, to indicate aliasing by a corresponding load instruction type, or with a reserved color Csp. The color Csp indicates, for example, either an absence of such aliasing, or that a count of bad bypass prevention decisions is above (in some embodiments, at or above) a threshold maximum count value. In various embodiments, operations such as those of method 600 are performed, for example, with classification circuitry 140 or colorization circuitry 340.

As shown in FIG. 6, method 600 comprises (at 610) determining an instruction pointer value for a load instruction such as load instruction 302. In an embodiment, the determining at 610 is performed with operations which, for example, are adapted from any of various conventional instruction processing techniques.

Method 600 further comprises (at 612) searching a load color cache (or other suitable data structure) based on the instruction pointer value determined at 610. For example, the searching at 612 includes or is otherwise based on the identification of an index value based on the instruction pointer value for the load instruction—e.g., wherein the index value is equal to the instruction pointer value, is a hash of the instruction pointer value, or the like. With the index value, the load color cache is searched to find an entry corresponding to a load instruction type associated with the instruction pointer value. In an example embodiment, the searching at 612 comprises colorization circuitry 340 searching LCC 330 to identify an entry which corresponds to an instruction type of load instruction 302. Alternatively or in addition, the searching at 612 is to identify one of entries 410a, 410b, . . . , 410m, for example.

Method 600 further comprises performing an evaluation (at 614) to determine whether the search at 612 resulted in a hit of any entry in the load color cache. Where it is determined at 614 that the searching at 612 did not result in a hit, method 600 tags the load instruction with the reserved color Csp (at 616). Such tagging at 622 is indicative that the instruction type of the load instruction is not currently aliasing with any load instruction type.

Where it is instead determined at 614 that the search at 612 did result in a hit, method 600 (at 618) determines—from the entry which was hit—a count N of bad bypass prevention decisions which were each based on a respective instruction of the load instruction type (and, for example, further based on a respective instruction of an aliasing store instruction type). Furthermore, method 600 performs an evaluation (at 620) to determine whether the count N indicates a saturation condition—e.g., wherein the count N is above (in some embodiments, at or above) a threshold maximum count value.

Where it is determined at 620 that the saturation condition is indicated, method 600 (at 616) tags the load instruction with the reserved color Csp. Where it is instead determined at 620 that the saturation condition is not indicated by the count N, method 600 (at 622) tags the load instruction with a color CLc which is currently assigned to the entry which was hit. In some embodiments, the color CLc is also currently associated with an entry of a store color cache (or other suitable data structure) which tracks the aliasing characteristics of various store instruction types.

Figure 7:
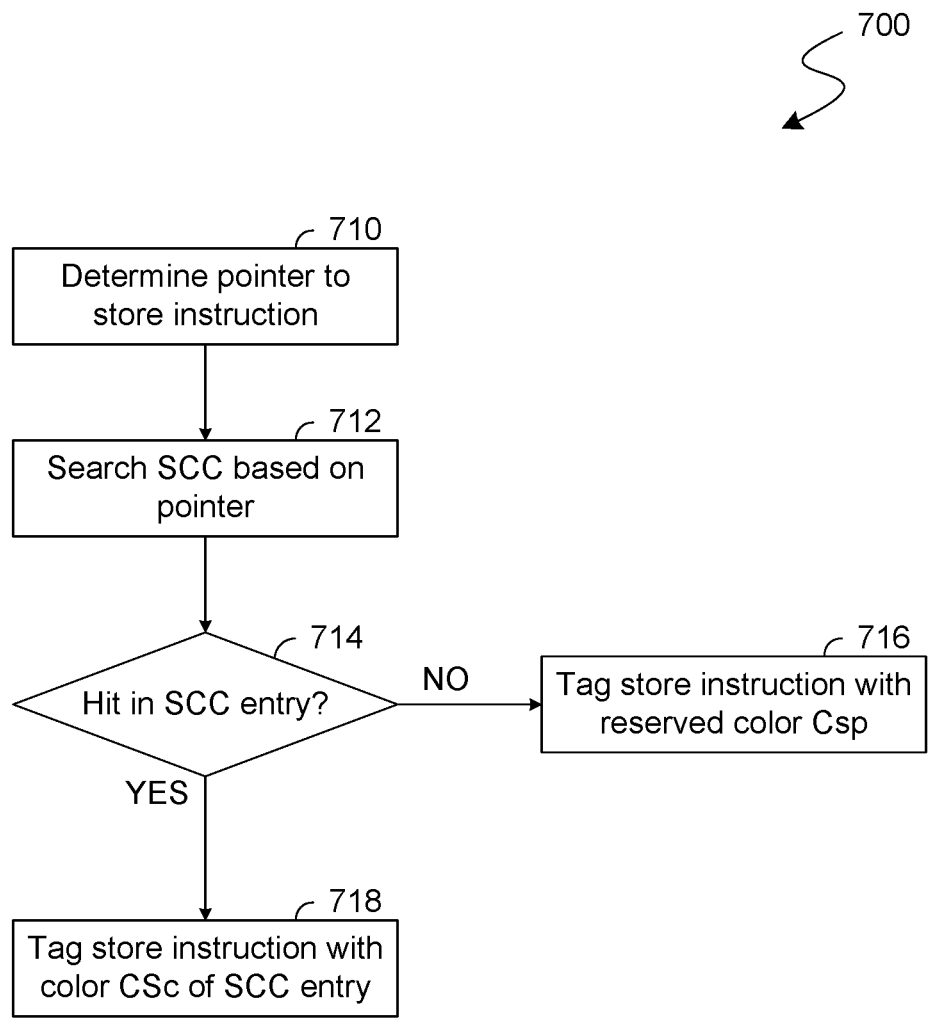
FIG. 7 shows a flow diagram illustrating features of a method to tag a store instruction with classification information according to an embodiment.

FIG. 7 shows features of a method 700 to tag a store instruction with classification information according to an embodiment. The method 700 illustrates one example of an embodiment wherein a store instruction is tagged with some color to indicate aliasing by a corresponding store instruction type, or with a reserved color to indicate the absence of such aliasing. In various embodiments, operations such as those of method 700 are performed, for example, with classification circuitry 140 or colorization circuitry 340.

As shown in FIG. 7, method 700 comprises (at 710) determining an instruction pointer value for a store instruction such as store instruction 304. In an embodiment, the determining at 710 is performed with operations which, for example, are adapted from any of various conventional instruction processing techniques. Method 700 further comprises (at 712) searching a store color cache (or other suitable data structure) based on the instruction pointer value determined at 710. For example, the searching at 712 includes or is otherwise based on the identification of an index value (based on the instruction pointer value for the store instruction) with which the store color cache is searched to find a corresponding entry. In an example embodiment, the searching at 712 comprises colorization circuitry 340 searching SCC 334 to identify an entry which corresponds to an instruction type of store instruction 304. Alternatively or in addition, the searching at 712 is to identify one of entries 460a, 460b, . . . , 460n, for example.

Method 700 further comprises performing an evaluation (at 714) to determine whether the search at 712 resulted in a hit of any entry in the store color cache. Where it is determined at 714 that the search at 712 did result in a hit, method 700 (at 718) tags the store instruction with a color (CSc) which is currently associated with the SCC entry that has been identified by the search. In some embodiments, the color CSc is also currently associated with an entry of a load color cache (or other suitable data structure) which tracks the aliasing characteristics of various load instruction types. Where it is instead determined at 714 that the searching at 712 did not result in a hit, method 700 instead tags the store instruction with the reserved color Csp (at 716). Such tagging at 716 is indicative that the instruction type of the store instruction is not currently aliasing with any load instruction type.

Figure 8:
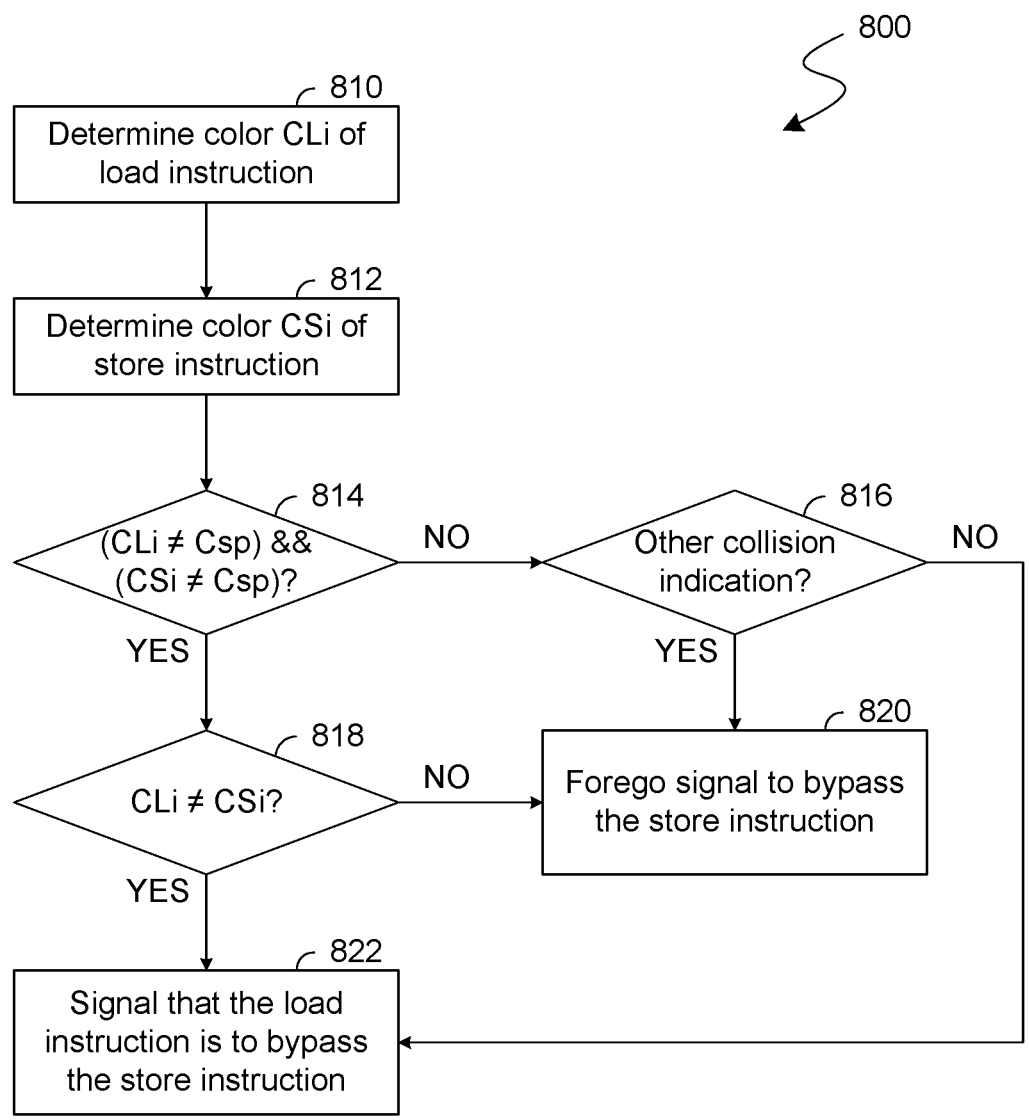
FIG. 8 shows a flow diagram illustrating features of a method to perform memory disambiguation based on instruction classification information according to an embodiment.

FIG. 8 shows features of a method 800 to perform memory disambiguation based on instruction classification information according to an embodiment. The method 800 illustrates one example of an embodiment wherein a relative order in which a load instruction and a store instruction are to be executed is determined based on tags which are associated with the instructions. The instructions are of different respective instruction types (corresponding to different respective instruction pointer values, for example) and are tagged each with a respective color. In one such embodiment, the load instruction is tagged based on a count of "bad" decisions each to forego a respective load bypass. In various embodiments, operations such as those of method 800 are performed, for example, with prediction circuitry 160 or prediction circuitry 360. Alternatively or in addition, operations of method 800 include or are otherwise based on operations of one or more of methods 200, 500, 600, 700—e.g., where in the load instruction and the store instruction are tagged according to methods 600, 700, respectively.

As shown in FIG. 8, method 800 comprises (at 810) determining a color CLi with which a load instruction has been tagged, wherein the load instruction has been provided to a load buffer such as one of load buffers 150, 350. Method 800 further comprises (at 812) determining a color CSi with which a store instruction has been tagged, wherein the store instruction has been provided to a store buffer such as one of store buffers 154, 354.

Method 800 further comprises performing an evaluation (at 814) as to whether (or not) either of the colors CLi, CSi is equal to a reserved color Csp. As described herein, in some embodiments, such a color Csp is indicative that either a corresponding instruction type is not currently aliasing with another one or more instruction types, or a corresponding count of bad bypass prevention decisions is below (and in some embodiments, below or equal to) a threshold maximum value.

Where it is determined at 814 that at least one of the colors CLi, CSi is equal to the reserved color Csp, method 800 performs an evaluation (at 816) as to whether or not, according to one or more other criteria, address collision is expected to occur between the load instruction and the store instruction.

In one such embodiment, the evaluation at 816 includes comparing a count of good bypass prevention decisions—e.g., the count specific corresponding to one and only one load instruction type—to a threshold minimum count value. By way of illustration and not limitation, an address collision is determined to be sufficiently unlikely where said count of good bypass prevention decisions is greater than (and in some embodiment, equal to or greater than) the threshold minimum count value. Otherwise, an address collision is indicated by the evaluation at 816.

Where it is determined at 816 that an address collision is not indicated by the prediction, method 800 (at 822) generates a signal to perform a load bypass wherein execution of the load instruction is to occur before execution of the store instruction. Where it is instead determined at 816 that an address collision is indicated by the prediction, method 800 (at 820) foregoes providing such a signal to perform the load bypass (e.g., wherein another signal is instead generated to indicate that the load instruction is to execute after the store instruction).

Where it is instead determined at 814 that neither of the colors CLi, CSi is equal to the reserved color Csp, method 800 performs an evaluation (at 818) to determine whether the colors CLi, CSi are equal to each other. Where it is determined at 818 that the colors CLi, CSi are equal to each other, method 800 performs an instance of the signaling at 822 to provide a load bypass. Where it is instead determined at 818 that the colors CLi, CSi are not equal to each other, method 800 (at 820) foregoes providing any such signaling to provide the load bypass.

Figure 9:
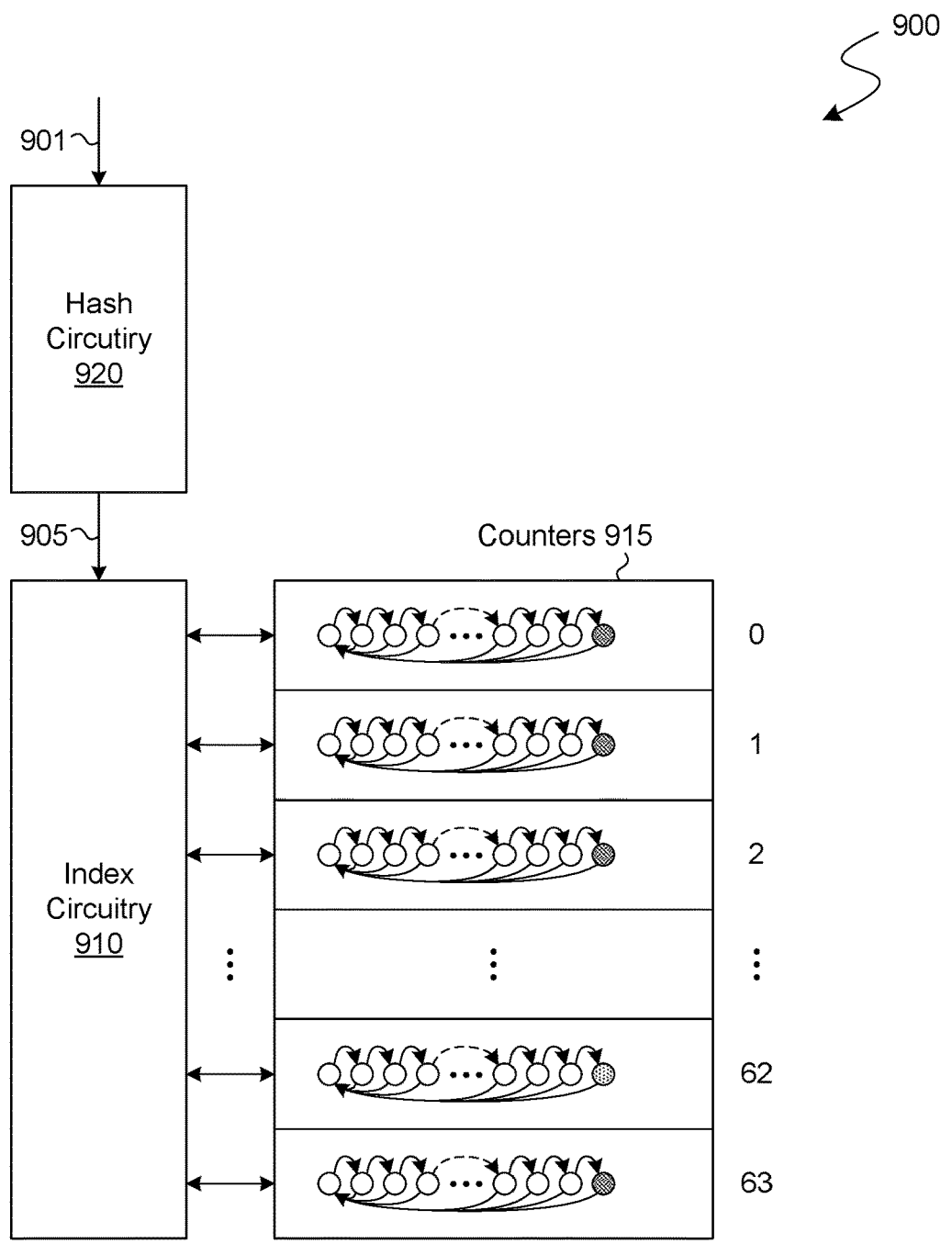
FIG. 9 shows a functional block diagram illustrating features of a collision prediction circuitry to provide a confidence metric which facilitates memory disambiguation according to an embodiment.

FIG. 9 shows features of address prediction circuitry 900 to provide a confidence metric which facilitates memory disambiguation according to an embodiment. In various embodiments, address prediction circuitry 900 provides functionality such as that of counter circuitry 380 and prediction circuitry 360—e.g., wherein one or more operations of method 200 are performed with address prediction circuitry 900.

As shown in FIG. 9, address prediction circuitry 900 comprises counters 915 which are each to correspond to a different respective load instruction type. In the example embodiment shown, said load instruction types each correspond to a respective instruction pointer value. Counters 915 are accessible using index circuitry 910 and hash circuitry 920—e.g., wherein execution circuitry 320, prediction circuitry 360, or other suitable circuitry provides a hashed version 901 of a given instruction pointer value 905 to access a particular one of counters 915 which corresponds to that instruction pointer value 905. For example, a given one of counters 915 is incremented or otherwise updated based on the detection (e.g., by evaluation unit 324) of a good bypass prevention decision for the load instruction type to which that counter corresponds. Alternatively or in addition, such a counter is (re)set to zero, or some other baseline value, based on the detection (e.g., by evaluation unit 324) of a bad bypass prevention decision for the corresponding load instruction type.

In one embodiment, six least significant bits of an instruction pointer value is used to index a prediction table of 64 entries (labeled 0 through 63) via indexing logic 910. In one embodiment, each predictor entry behaves as a counter of 16 states, including a reset state, implemented in 4 bits. In other embodiments, more or fewer bits of the pointer value, or some function of the pointer value, are used to index more or fewer predictor table entries. Likewise, in other embodiments each entry may behave as a counter with more or fewer states using more or fewer bits. Furthermore, other history tracking techniques may be used in other embodiments.

The figures described herein detail exemplary architectures and systems to implement embodiments of the above. In some embodiments, one or more hardware components and/or instructions described herein are emulated as detailed below, or implemented as software modules.

Embodiments of the instruction(s) detailed above are embodied may be embodied in a "generic vector friendly instruction format" which is detailed herein. In other embodiments, such a format is not utilized and another instruction format is used, however, the description herein of the writemask registers, various data transformations (swizzle, broadcast, etc.), addressing, etc. is generally applicable to the description of the embodiments of the instruction(s) above. Additionally, exemplary systems, architectures, and pipelines are detailed herein. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed herein. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
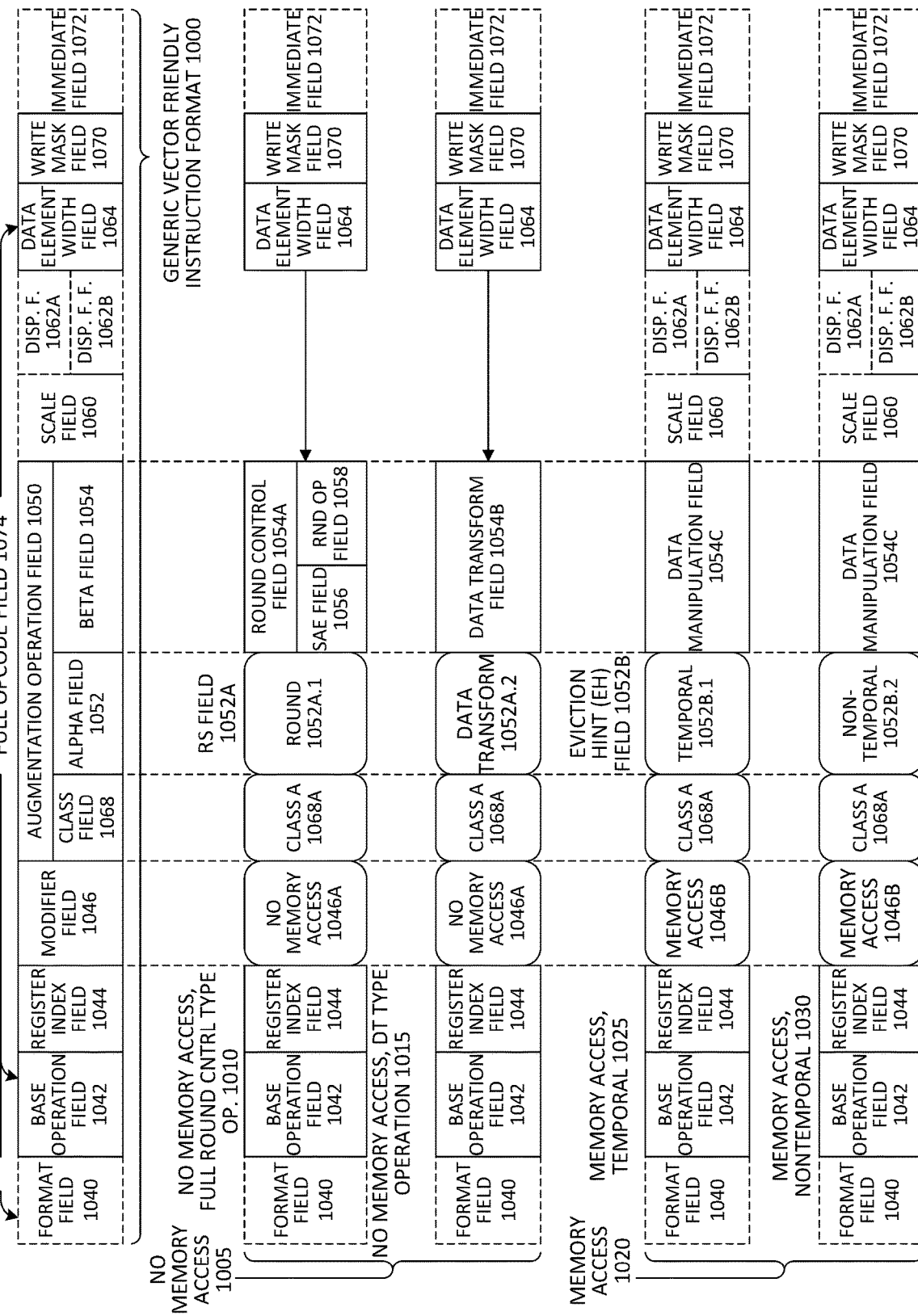
FIGS. 10A through 10B are block diagrams illustrating a generic vector friendly instruction format and instruction templates thereof according to embodiments of the invention.
Figure 10B:
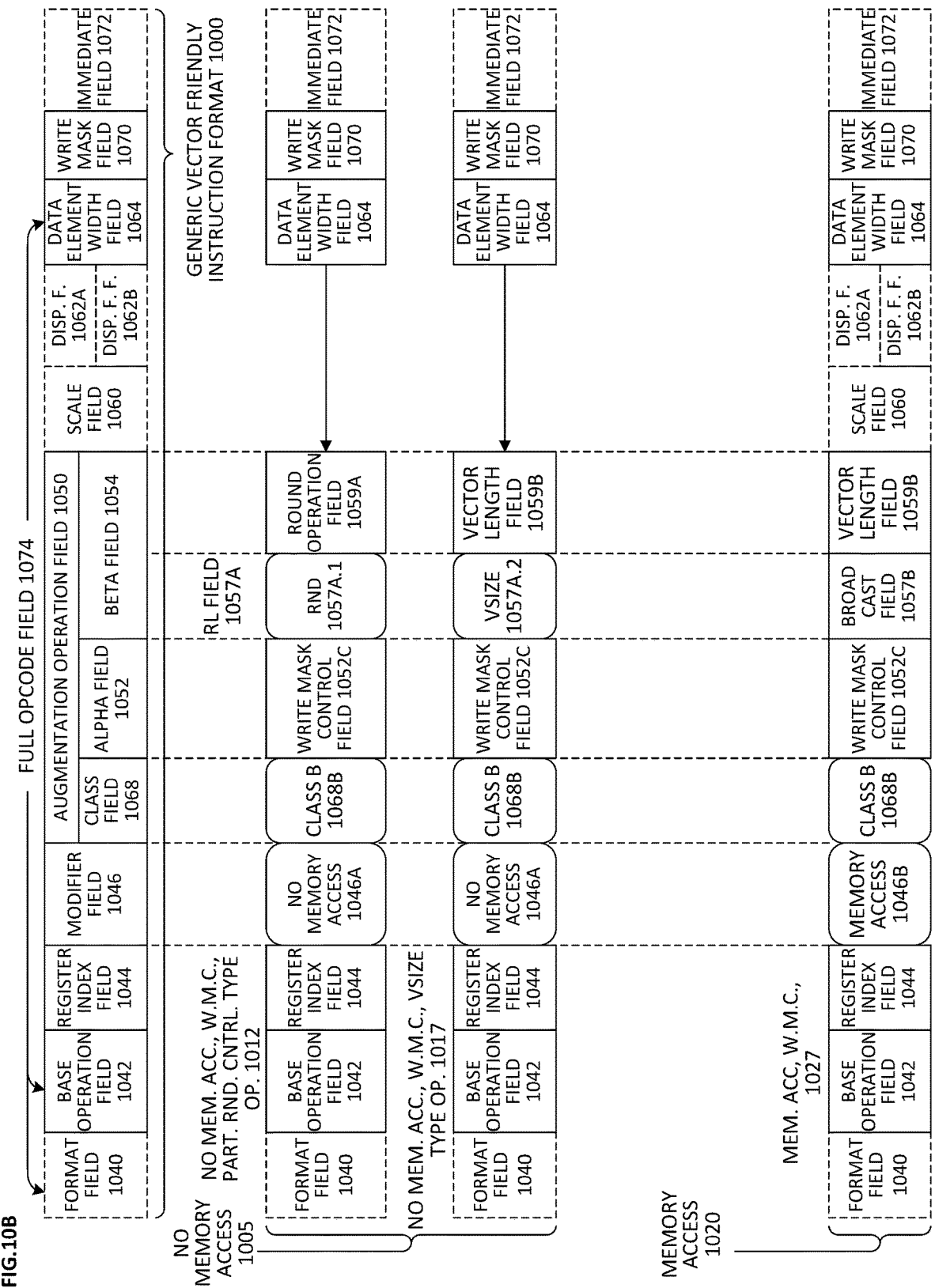

FIGS. 10A through 10B are block diagrams illustrating a generic vector friendly instruction format and instruction templates thereof according to embodiments of the invention. FIG. 10A is a block diagram illustrating a generic vector friendly instruction format and class A instruction templates thereof according to embodiments of the invention; while FIG. 10B is a block diagram illustrating the generic vector friendly instruction format and class B instruction templates thereof according to embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, VSIZE type operation 1017 instruction template; and 2) within the memory access 1020 instruction templates there is shown a memory access, write mask control 1027 instruction template.

The generic vector friendly instruction format 1000 includes the following fields listed herein in the order illustrated in FIGS. 10A through 10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates (e.g., no memory access 1046A and memory access 1046B for the class field 1046 respectively in FIGS. 10A-B). Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In one embodiment of the invention, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses 2scale*index+base).

Displacement Field 1062A—its content is used as part of memory address generation (e.g., for address generation that uses 2scale*index+base+displacement).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the write mask field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one embodiment of the invention where a processor includes a control register for specifying rounding modes, the round operation control field's 1058 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1012 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In one embodiment of the invention where a processor includes a control register for specifying rounding modes, the round operation control field's 1058 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11 is a block diagram illustrating an exemplary specific vector friendly instruction format according to embodiments of the invention. FIG. 11 shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11 map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the invention is not so limited (that is, the generic vector friendly instruction format 1000 contemplates other sizes of the data element width field 1064).

The specific vector friendly instruction format 1100 includes the following fields listed herein in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in one embodiment of the invention).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and 1057BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment of the invention, this bit, along with others as indicated herein, is stored in bit inverted format to distinguish (in the well-known x86 32-bit mode) from the BOUND instruction, whose real opcode byte is 62, but does not accept in the MOD R/M field (described herein) the value of 11 in the MOD field; alternative embodiments of the invention do not store this and the other indicated bits herein in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EVEX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]—U)—If EVEX.U=0, it indicates class A or EVEX.U0; if EVEX.U=1, it indicates class B or EVEX.U1.

Prefix encoding field 1125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

Scale, Index, Base (SIB) Byte 1150 (Byte 6)—As previously described, the scale field's 1060 content is used for memory address generation. SIB.SS 1152, SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format 1100 that make up the full opcode field 1074 according to one embodiment of the invention. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to one embodiment of the invention. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
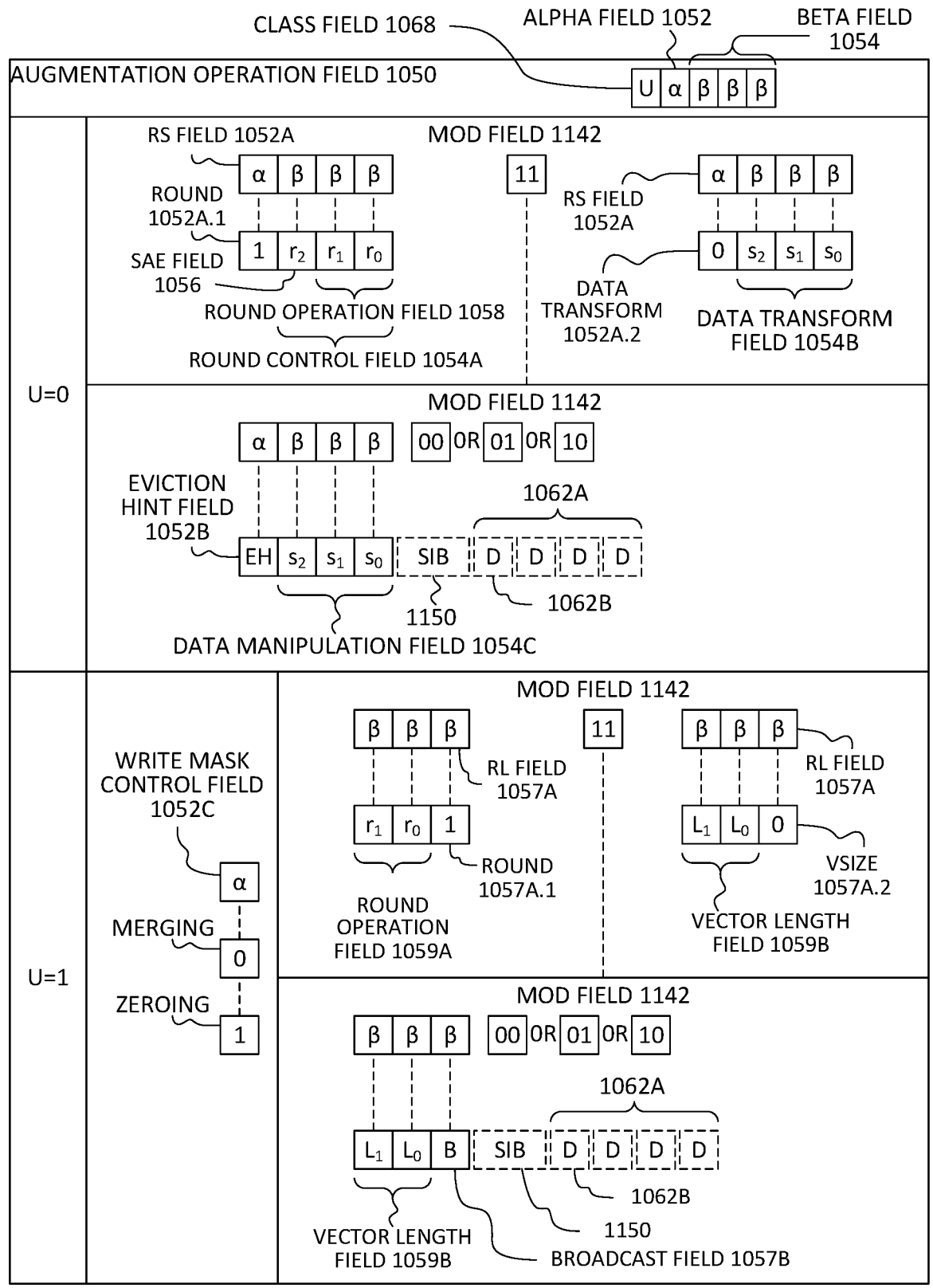

FIG. 11D is a block diagram illustrating the fields of the specific vector friendly instruction format 1100 that make up the augmentation operation field 1050 according to one embodiment of the invention. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOD field 1142 contains 00, 01, or 10 (signifying a memory access operation), the alpha field 1052 (EVEX byte 3, bit [7]—EH) is interpreted as the eviction hint (EH) field 1052B and the beta field 1054 (EVEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—S0) is interpreted as the RL field 1057A; when it contains a 1 (round 1057A.1) the rest of the beta field 1054 (EVEX byte 3, bit [6-5]—S2-1) is interpreted as the round operation field 1059A, while when the RL field 1057A contains a 0 (VSIZE 1057.A2) the rest of the beta field 1054 (EVEX byte 3, bit [6-5]—S2-1) is interpreted as the vector length field 1059B (EVEX byte 3, bit [6-5]—L1-0). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]—L1-0) and the broadcast field 1057B (EVEX byte 3, bit [4]—B).

Exemplary Register Architecture

Figure 12:
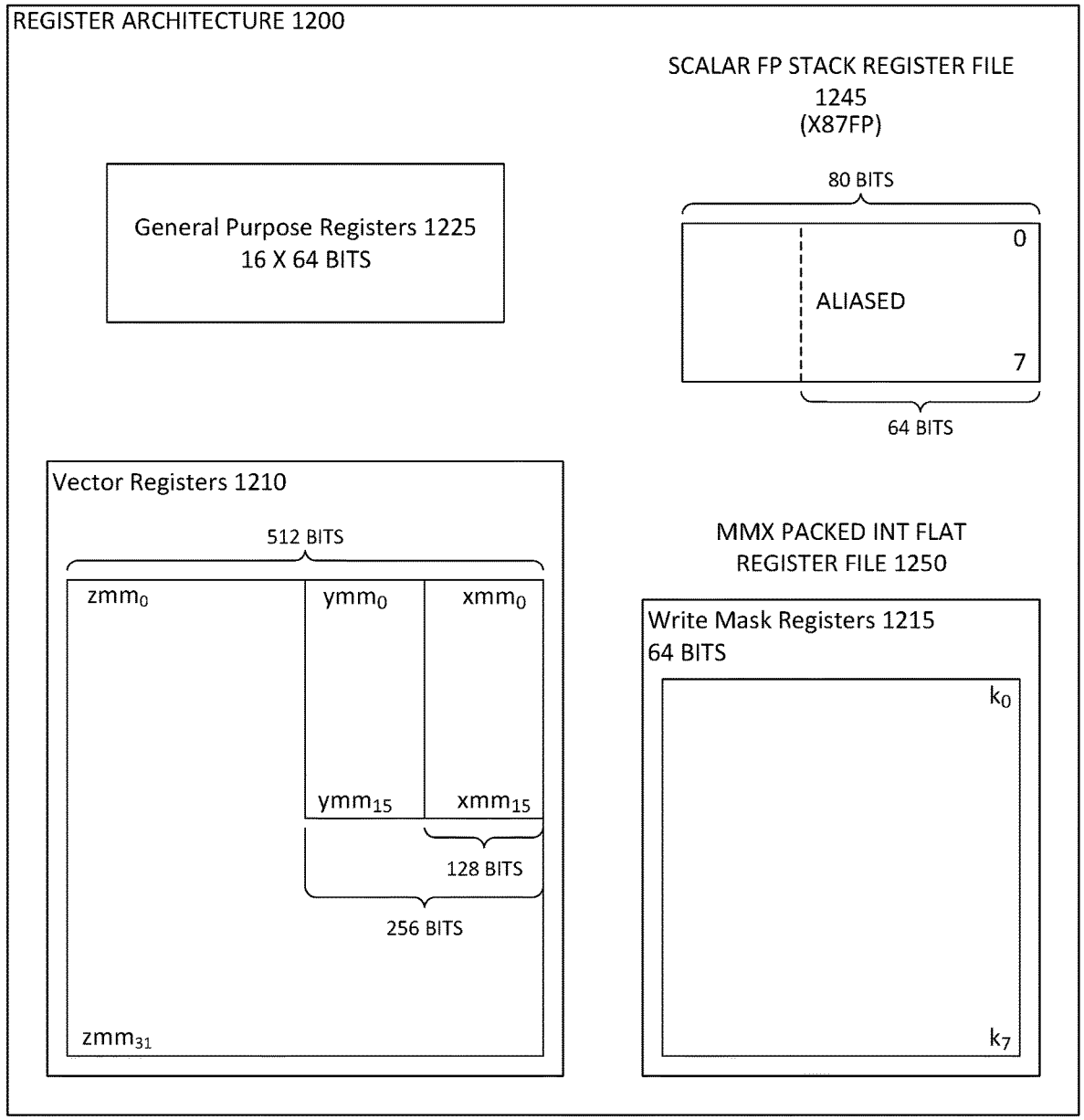
FIG. 12 is a block diagram of a register architecture according to one embodiment of the invention.

FIG. 12 is a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1406, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
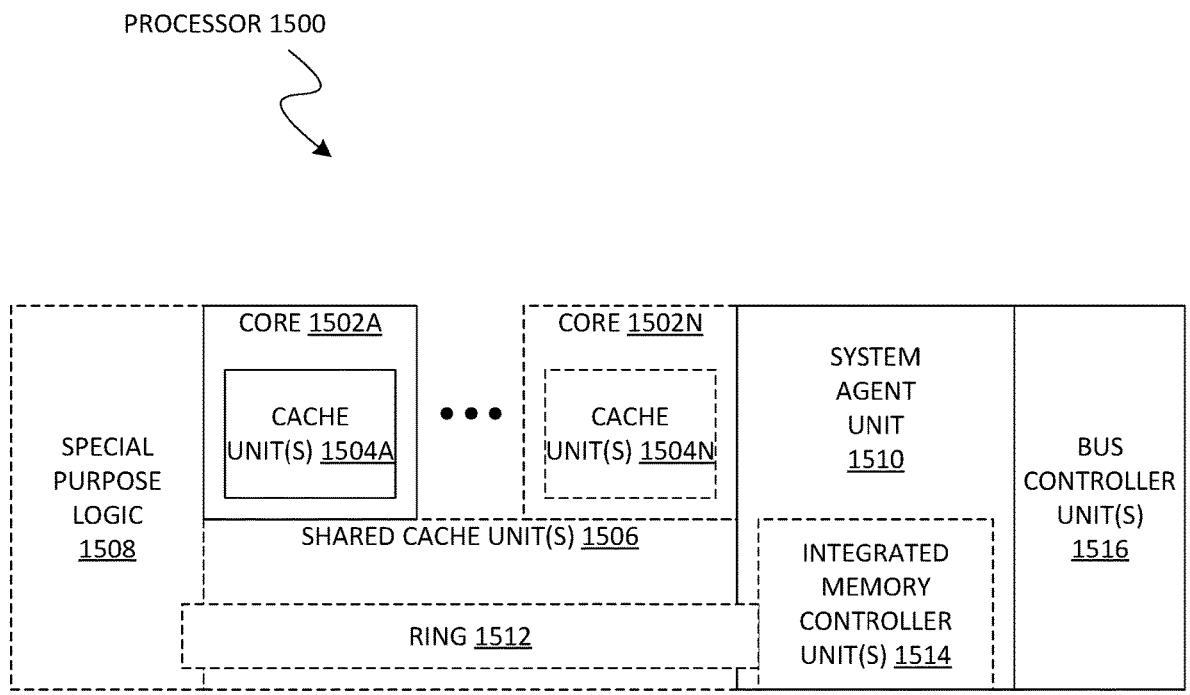
FIG. 15 is a block diagram of a processor that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes respective one or more levels of caches 1504A-N within cores 1502A-N, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the special purpose logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the special purpose logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16 through 19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
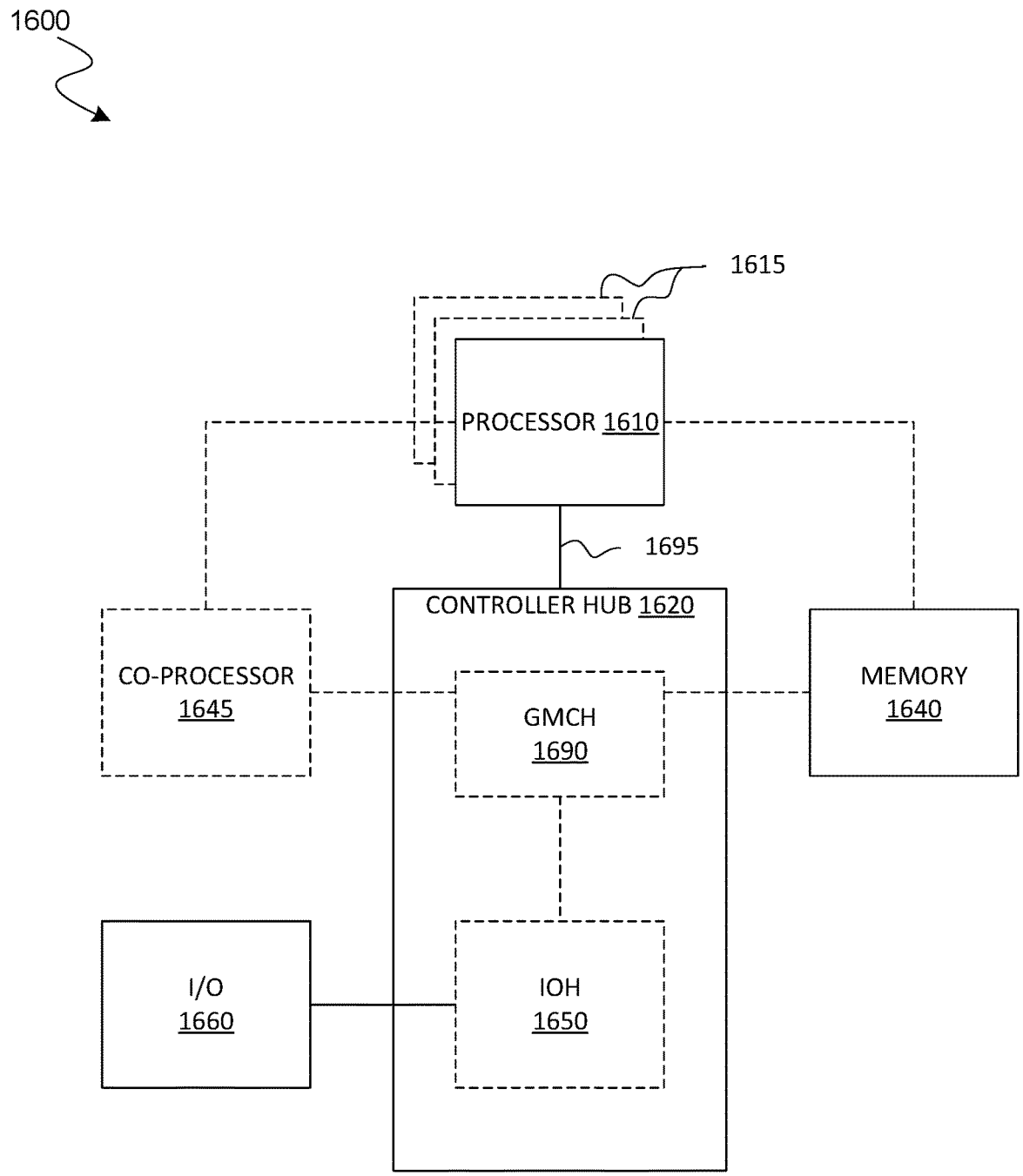
FIGS. 16 through 19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the processors 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
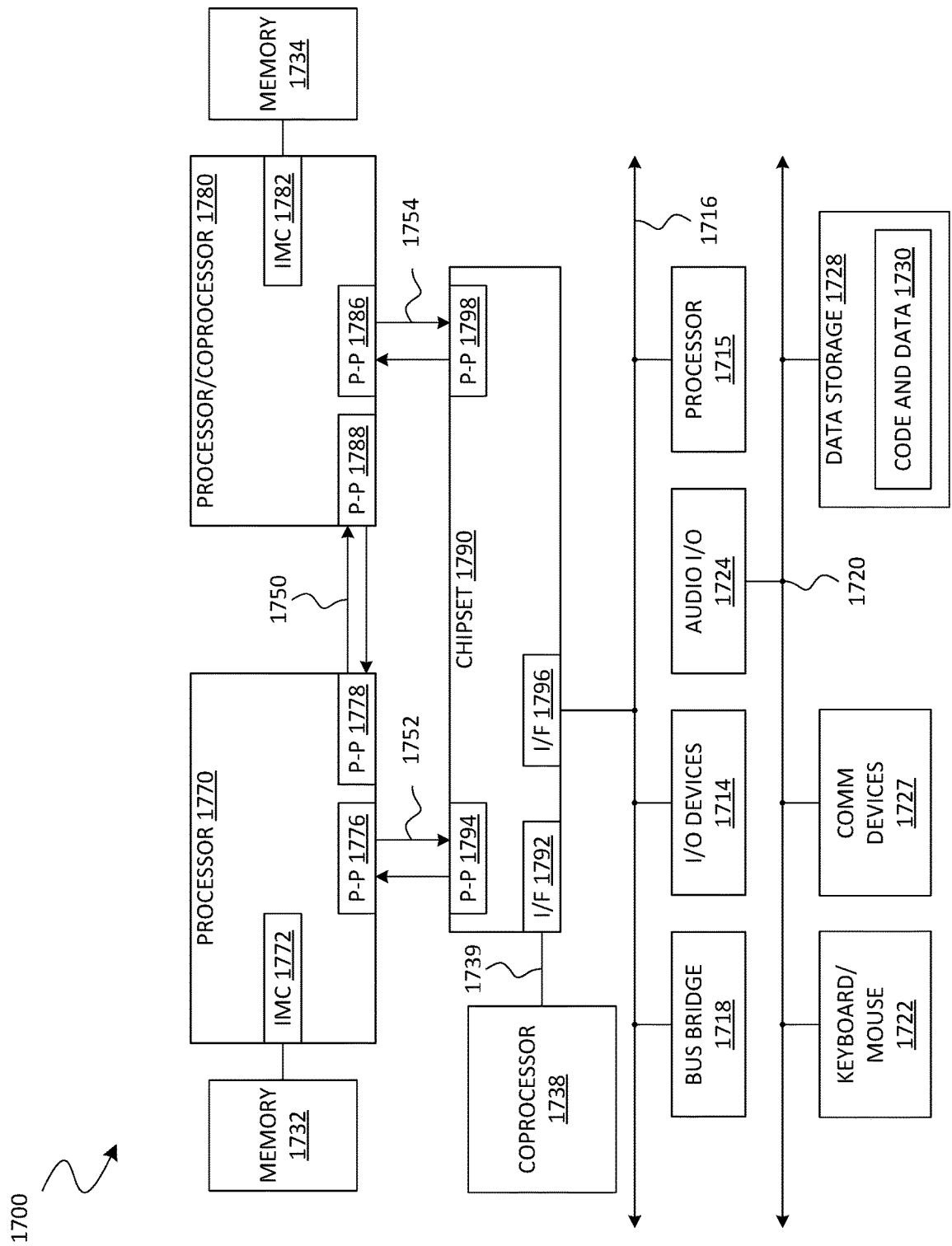

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller unit's point-to-point (P-P) interfaces 1776 and 1778; similarly, second processor 1780 includes P-P interfaces 1786 and 1788. Processors 1770, 1780 may exchange information via a point-to-point (P-P) interconnect 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1792 and an interconnect 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
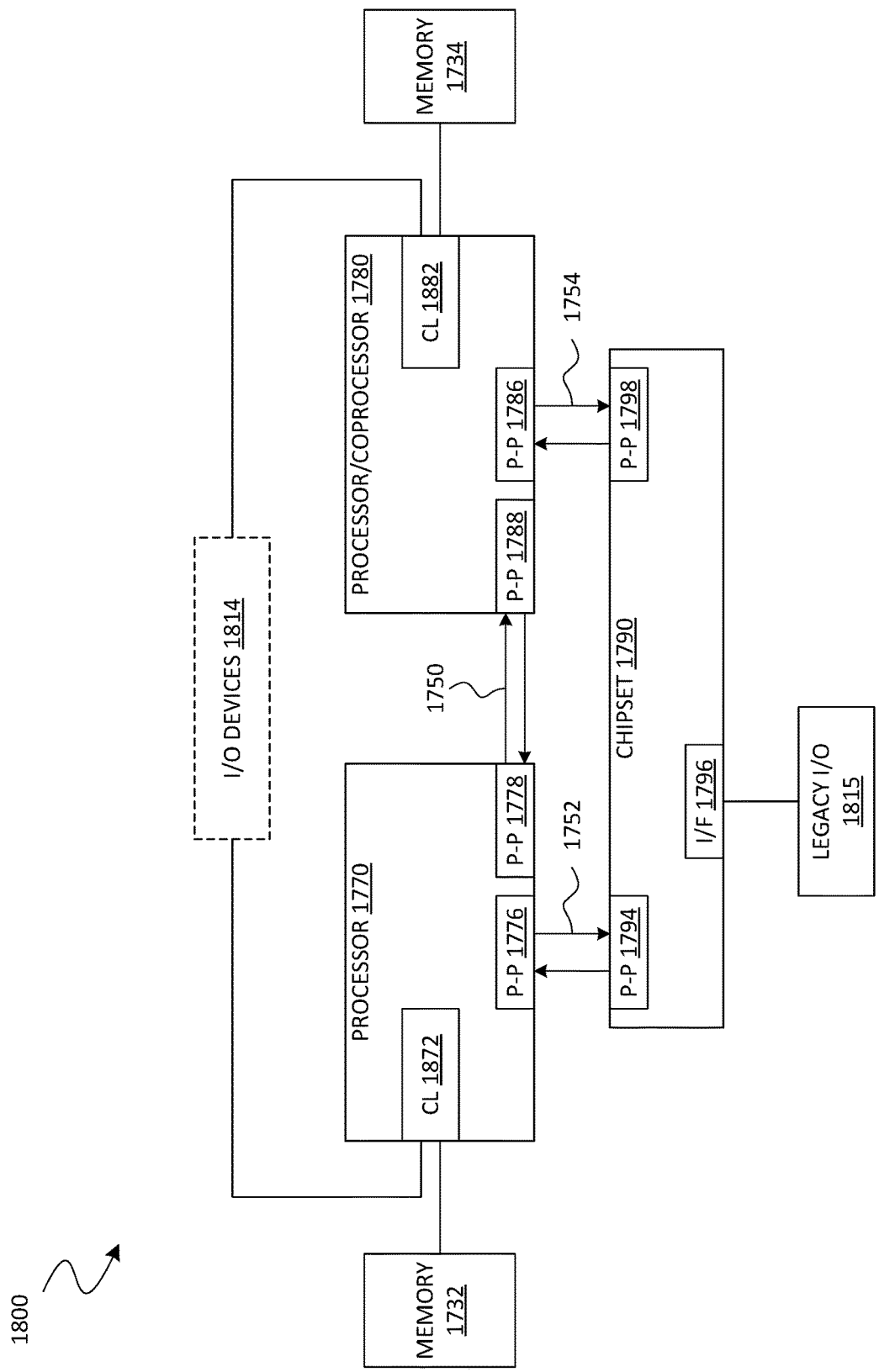

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1872 and 1882, respectively. Thus, the CL 1872, 1882 include integrated memory controller units and include I/O control logic. FIG. 18 illustrates that not only are the memories 1732, 1734 coupled to the CL 1872, 1882, but also that I/O devices 1814 are also coupled to the control logic 1872, 1882. Legacy I/O devices 1815 are coupled to the chipset 1790.

Figure 19:
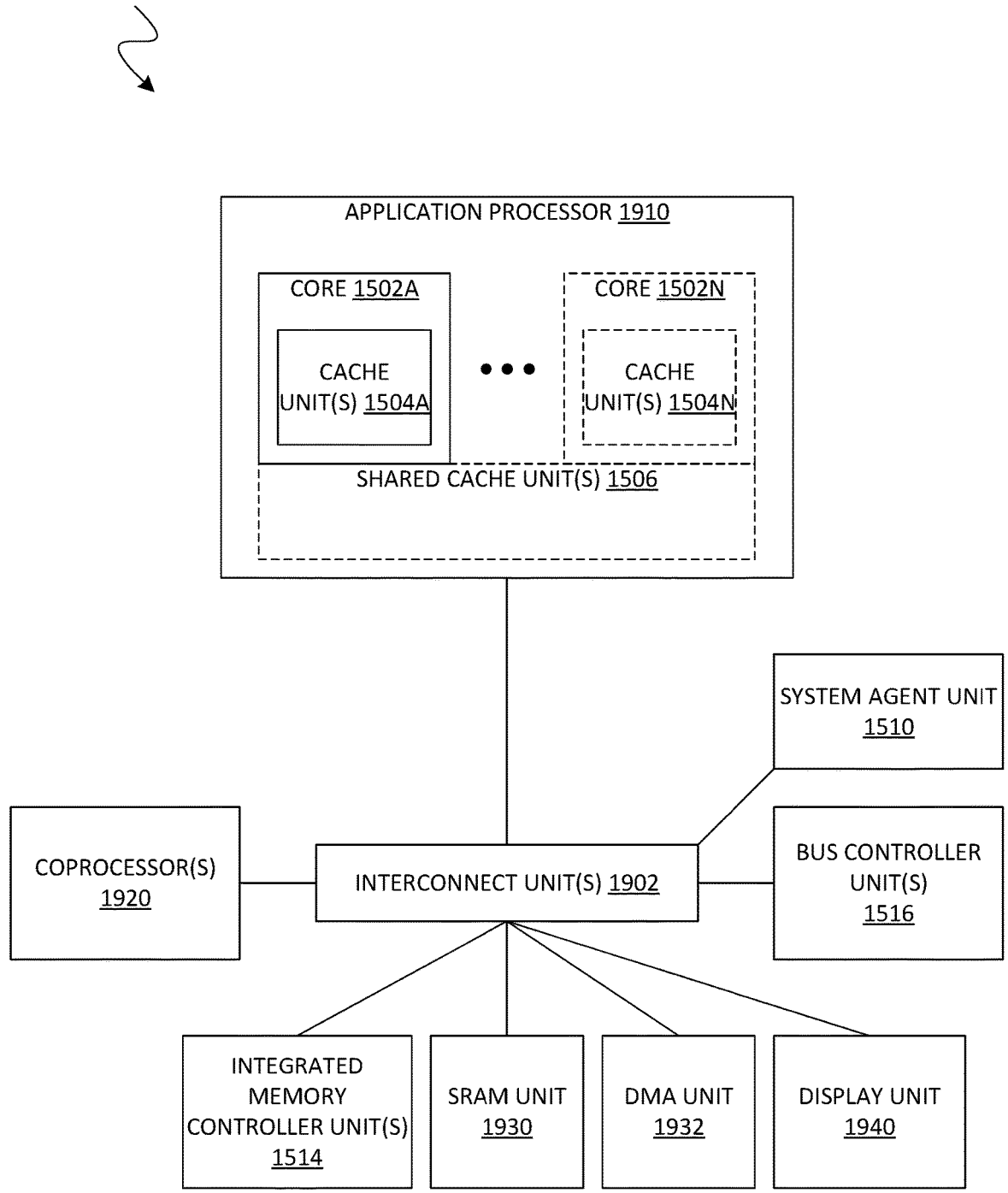

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
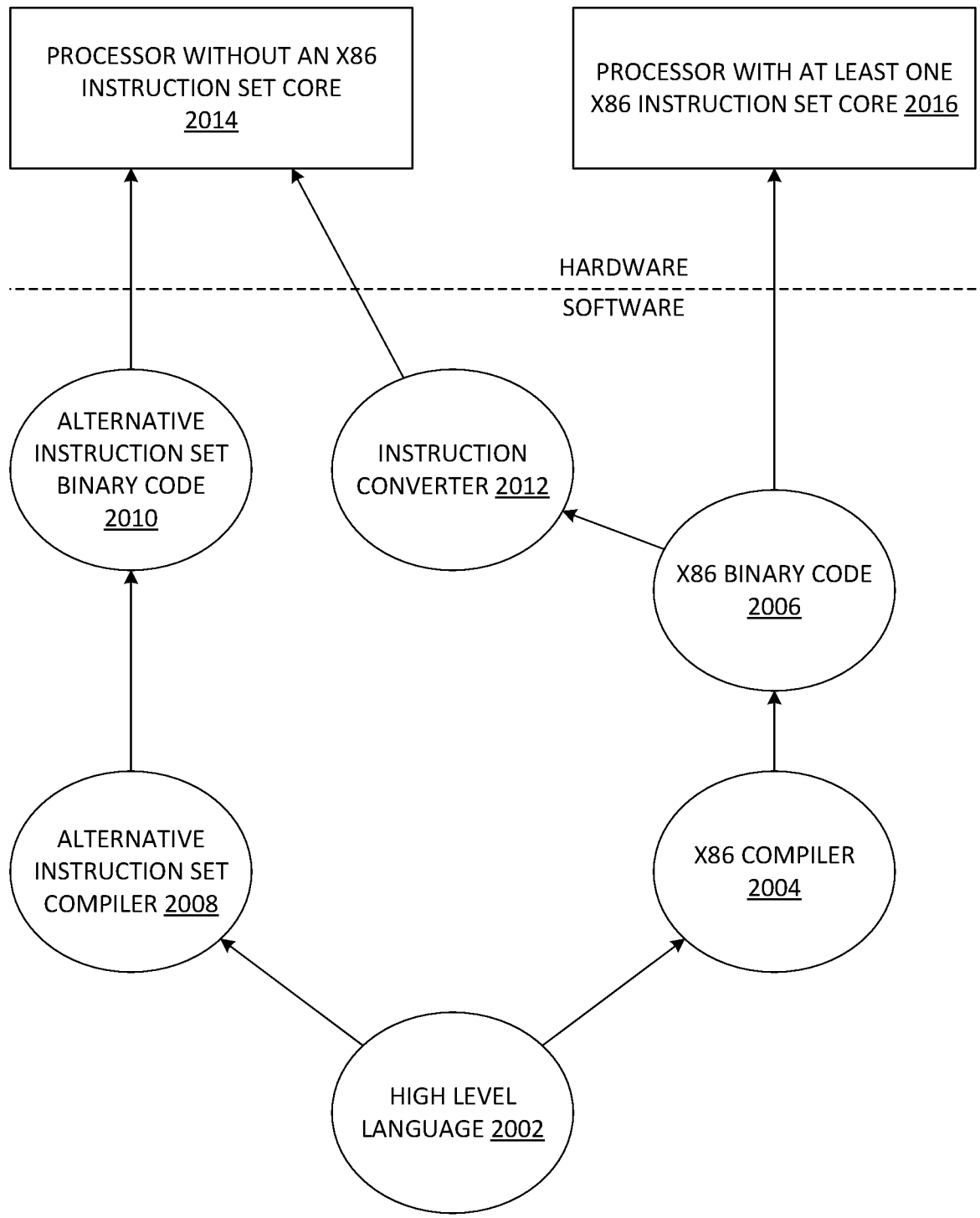
FIG. 20 is a block diagram contrasting the use of a software instruction converter to convert binary instructions in a source instruction set to binary instructions in a target instruction set according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, CA and/or that execute the ARM instruction set of ARM Holdings of Sunnyvale, CA). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

In one or more first embodiments, a processor comprises manager circuitry to detect an address collision event wherein a memory address is targeted by both a first load instruction of a first instruction type and a first store instruction of a second instruction type, wherein the first instruction type and the second instruction type correspond to different respective instruction pointer values, and determine, based on the address collision event, a count of decisions each to forego a reversal of an order of execution of a respective instruction of the first instruction type and a respective instruction of the second instruction type, classification circuitry to perform an evaluation of the count based on a threshold maximum count value, and prediction circuitry, coupled to the classification circuitry, to generate, based on the evaluation, a signal to determine an order of execution of a second load instruction of the first instruction type and a second store instruction of the second instruction type.

In one or more second embodiments, further to the first embodiment, the first instruction type is to correspond to a first instruction pointer value, and the second instruction type is to correspond to a second instruction pointer value, and wherein the manager circuitry is further to provide reference information, based on the address collision event, to indicate an assignment of a color to both the first instruction type and the second instruction type, the classification circuitry is further to identify the first instruction type and the second instruction type based on the second load instruction and the second store instruction, respectively, and access the reference information, based on the first instruction type and the second instruction type, to detect the assignment.

In one or more third embodiments, further to the second embodiment, the classification circuitry is further to tag the second load instruction, based on the assignment and the evaluation, with one of the first color or a second color to generate a first tagged instruction, and tag the second store instruction with the first color, based on the assignment, to generate a second tagged instruction.

In one or more fourth embodiments, further to the third embodiment, the processor further comprises counter circuitry to maintain a count of good bypass prevention decisions which are each based on a respective instruction of the first instruction type, wherein the prediction circuitry is to determine, based on the one of the first color or the second color, whether the order of execution of the second load instruction and the second store instruction is to be independent of the count of good bypass prevention decisions.

In one or more fifth embodiments, further to the first embodiment or the second embodiment, the manager circuitry is to increment the count based on an instance of two instructions, each of a different respective one of the first instruction type or the second instruction type, which target different respective memory addresses, and reset the count to a baseline value based on an instance of two other instructions, each of a different respective one of the first instruction type or the second instruction type, which target a same memory address.

In one or more sixth embodiments, further to the first embodiment or the second embodiment, the classification circuitry is further to provide the tagged load instruction to a load buffer, provide the tagged store instruction to a store buffer, wherein the prediction circuitry is to determine that a first tagged instruction at the load buffer comprises a third load instruction and a first tag, determine that a first tagged instruction at the store buffer comprises a third store instruction and a second tag, wherein where neither the first tag nor the second tag is equal to the second color, and the first tag is equal to the second tag, the processor is to execute the third load instruction after the third store instruction, and where neither the first tag nor the second tag is equal to the second color, and the first tag is not equal to the second tag, the processor is to execute the third load instruction before the third store instruction.

In one or more seventh embodiments, further to the sixth embodiment, where the third load instruction is of a third instruction type, and where the first tag or the second tag is equal to the second color, the prediction circuitry is to determine an order of execution of the third load instruction and the third store instruction based on a count of good bypass prevention decisions which are each based on a respective instruction of a third instruction type.

In one or more eighth embodiments, a method at a processor comprises detecting that a memory address is targeted by both a first load instruction of a first instruction type and a first store instruction of a second instruction type, wherein the first instruction type and the second instruction type correspond to different respective instruction pointer values, based on the detecting, determining a count of decisions each to forego a reversal of an order of execution of a respective instruction of the first instruction type and a respective instruction of the second instruction type, performing an evaluation of the count based on a threshold maximum count value, and based on the evaluation, generating a signal to determine an order of execution of a second load instruction of the first instruction type and a second store instruction of the second instruction type.

In one or more ninth embodiments, further to the eighth embodiment, the first instruction type corresponds to a first instruction pointer value, and the second instruction type corresponds to a second instruction pointer value, the method further comprises based on the detecting, providing reference information to indicate an assignment of a color to both the first instruction type and the second instruction type, identifying the first instruction type and the second instruction type based on the second load instruction and the second store instruction, respectively, and based on the identifying, accessing the reference information to detect the assignment.

In one or more tenth embodiments, further to the ninth embodiment, the method further comprises based on the assignment and the evaluation, tagging the second load instruction with one of the first color or a second color to generate a first tagged instruction, and based on the assignment, tagging the second store instruction with the first color to generate a second tagged instruction.

In one or more eleventh embodiments, further to the tenth embodiment, the method further comprises maintaining a count of good bypass prevention decisions which are each based on a respective instruction of the first instruction type, and determining, based on the one of the first color or the second color, whether the order of execution of the second load instruction and the second store instruction is to be independent of the count of good bypass prevention decisions.

In one or more twelfth embodiments, further to the eighth embodiment or the ninth embodiment, the method further comprises incrementing the count based on an instance of two instructions, each of a different respective one of the first instruction type or the second instruction type, targeting different respective memory addresses, and resetting the count to a baseline value based on an instance of two other instructions, each of a different respective one of the first instruction type or the second instruction type, targeting a same memory address.

In one or more thirteenth embodiments, further to the eighth embodiment or the ninth embodiment, the method further comprises providing the tagged load instruction to a load buffer, providing the tagged store instruction to a store buffer, determining that a first tagged instruction at the load buffer comprises a third load instruction and a first tag, determining that a first tagged instruction at the store buffer comprises a third store instruction and a second tag, where neither the first tag nor the second tag is equal to the second color, and the first tag is equal to the second tag, executing the third load instruction after the third store instruction, and where neither the first tag nor the second tag is equal to the second color, and the first tag is not equal to the second tag, executing the third load instruction before the third store instruction.

In one or more fourteenth embodiments, further to the thirteenth embodiment, the third load instruction is of a third instruction type, and where the first tag or the second tag is equal to the second color, determining an order of execution of the third load instruction and the third store instruction based on a count of good bypass prevention decisions which are each based on a respective instruction of a third instruction type.

In one or more fifteenth embodiments, a system comprises a processor comprising manager circuitry to detect an address collision event wherein a memory address is targeted by both a first load instruction of a first instruction type and a first store instruction of a second instruction type, wherein the first instruction type and the second instruction type correspond to different respective instruction pointer values, and determine, based on the address collision event, a count of decisions each to forego a reversal of an order of execution of a respective instruction of the first instruction type and a respective instruction of the second instruction type, classification circuitry to perform an evaluation of the count based on a threshold maximum count value, and prediction circuitry, coupled to the classification circuitry, to generate, based on the evaluation, a signal to determine an order of execution of a second load instruction of the first instruction type and a second store instruction of the second instruction type. The system further comprises a display device coupled to the processor, the display device to display an image based on the second load instruction and the second store instruction.

In one or more sixteenth embodiments, further to the fifteenth embodiment, the first instruction type is to correspond to a first instruction pointer value, and the second instruction type is to correspond to a second instruction pointer value, and wherein the manager circuitry is further to provide reference information, based on the address collision event, to indicate an assignment of a color to both the first instruction type and the second instruction type, the classification circuitry is further to identify the first instruction type and the second instruction type based on the second load instruction and the second store instruction, respectively, and access the reference information, based on the first instruction type and the second instruction type, to detect the assignment.

In one or more seventeenth embodiments, further to the sixteenth embodiment, the classification circuitry is further to tag the second load instruction, based on the assignment and the evaluation, with one of the first color or a second color to generate a first tagged instruction, and tag the second store instruction with the first color, based on the assignment, to generate a second tagged instruction.

In one or more eighteenth embodiments, further to the seventeenth embodiment, the processor further comprises counter circuitry to maintain a count of good bypass prevention decisions which are each based on a respective instruction of the first instruction type, wherein the prediction circuitry is to determine, based on the one of the first color or the second color, whether the order of execution of the second load instruction and the second store instruction is to be independent of the count of good bypass prevention decisions.

In one or more nineteenth embodiments, further to the fifteenth embodiment or the sixteenth embodiment, the manager circuitry is to increment the count based on an instance of two instructions, each of a different respective one of the first instruction type or the second instruction type, which target different respective memory addresses, and reset the count to a baseline value based on an instance of two other instructions, each of a different respective one of the first instruction type or the second instruction type, which target a same memory address.

In one or more twentieth embodiments, further to the fifteenth embodiment or the sixteenth embodiment, the classification circuitry is further to provide the tagged load instruction to a load buffer, provide the tagged store instruction to a store buffer, wherein the prediction circuitry is to determine that a first tagged instruction at the load buffer comprises a third load instruction and a first tag, determine that a first tagged instruction at the store buffer comprises a third store instruction and a second tag, wherein where neither the first tag nor the second tag is equal to the second color, and the first tag is equal to the second tag, the processor is to execute the third load instruction after the third store instruction, and where neither the first tag nor the second tag is equal to the second color, and the first tag is not equal to the second tag, the processor is to execute the third load instruction before the third store instruction.

In one or more twenty-first embodiments, further to the twentieth embodiment, where the third load instruction is of a third instruction type, and where the first tag or the second tag is equal to the second color, the prediction circuitry is to determine an order of execution of the third load instruction and the third store instruction based on a count of good bypass prevention decisions which are each based on a respective instruction of a third instruction type.

Techniques and architectures for determining an execution of instructions to access memory are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
   manager circuitry to:
      detect an address collision event wherein a memory address is targeted by both a first load instruction of a first instruction type and a first store instruction of a second instruction type, wherein the first instruction type and the second instruction type correspond to different respective instruction pointer values; and
      determine, based on the address collision event, a count of decisions each to forego a reversal of an order of execution of a respective instruction of the first instruction type and a respective instruction of the second instruction type;
   classification circuitry to perform an evaluation of the count based on a threshold maximum count value; and prediction circuitry, coupled to the classification circuitry, to generate, based on the evaluation, a signal to determine an order of execution of a second load instruction of the first instruction type and a second store instruction of the second instruction type.

2. The processor of claim 1, wherein the first instruction type is to correspond to a first instruction pointer value, and the second instruction type is to correspond to a second instruction pointer value, and wherein:
the manager circuitry is further to provide reference information, based on the address collision event, to indicate an assignment of a color to both the first instruction type and the second instruction type;
the classification circuitry is further to:
identify the first instruction type and the second instruction type based on the second load instruction and the second store instruction, respectively; and
access the reference information, based on the first instruction type and the second instruction type, to detect the assignment.

3. The processor of claim 2, wherein the classification circuitry is further to:
tag the second load instruction, based on the assignment and the evaluation, with one of a first color or a second color to generate a first tagged instruction; and
tag the second store instruction with the first color, based on the assignment, to generate a second tagged instruction.

4. The processor of claim 3, further comprising:
counter circuitry to maintain a count of good bypass prevention decisions which are each based on a respective instruction of the first instruction type;
wherein the prediction circuitry is to determine, based on the one of the first color or the second color, whether the order of execution of the second load instruction and the second store instruction is to be independent of the count of good bypass prevention decisions.

5. The processor of claim 1, wherein the manager circuitry is to:
increment the count based on an instance of two instructions, each of a different respective one of the first instruction type or the second instruction type, which target different respective memory addresses; and
reset the count to a baseline value based on an instance of two other instructions, each of a different respective one of the first instruction type or the second instruction type, which target a same memory address.

6. The processor of claim 1, wherein the classification circuitry is further to:
provide a tagged load instruction to a load buffer;
provide a tagged store instruction to a store buffer;
wherein the prediction circuitry is to:
determine that a first tagged instruction at the load buffer comprises a third load instruction and a first tag;
determine that a first tagged instruction at the store buffer comprises a third store instruction and a second tag;
wherein:
where neither the first tag nor the second tag is equal to a color, and the first tag is equal to the second tag, the processor is to execute the third load instruction after the third store instruction; and
where neither the first tag nor the second tag is equal to the color, and the first tag is not equal to the second tag, the processor is to execute the third load instruction before the third store instruction.

7. The processor of claim 6, wherein, where the third load instruction is of a third instruction type, and where the first tag or the second tag is equal to the color, the prediction circuitry is to determine an order of execution of the third load instruction and the third store instruction based on a count of good bypass prevention decisions which are each based on a respective instruction of a third instruction type.

8. A method at a processor, the method comprising:
detecting that a memory address is targeted by both a first load instruction of a first instruction type and a first store instruction of a second instruction type, wherein the first instruction type and the second instruction type correspond to different respective instruction pointer values;
based on the detecting, determining a count of decisions each to forego a reversal of an order of execution of a respective instruction of the first instruction type and a respective instruction of the second instruction type;
performing an evaluation of the count based on a threshold maximum count value; and
based on the evaluation, generating a signal to determine an order of execution of a second load instruction of the first instruction type and a second store instruction of the second instruction type.

9. The method of claim 8, wherein the first instruction type corresponds to a first instruction pointer value, and the second instruction type corresponds to a second instruction pointer value, the method further comprising:
based on the detecting, providing reference information to indicate an assignment of a color to both the first instruction type and the second instruction type;
identifying the first instruction type and the second instruction type based on the second load instruction and the second store instruction, respectively; and
based on the identifying, accessing the reference information to detect the assignment.

10. The method of claim 9, further comprising:
based on the assignment and the evaluation, tagging the second load instruction with one of a first color or a second color to generate a first tagged instruction; and
based on the assignment, tagging the second store instruction with the first color to generate a second tagged instruction.

11. The method of claim 10, further comprising:
maintaining a count of good bypass prevention decisions which are each based on a respective instruction of the first instruction type; and
determining, based on the one of the first color or the second color, whether the order of execution of the second load instruction and the second store instruction is to be independent of the count of good bypass prevention decisions.

12. The method of claim 8, further comprising:
incrementing the count based on an instance of two instructions, each of a different respective one of the first instruction type or the second instruction type, targeting different respective memory addresses; and
resetting the count to a baseline value based on an instance of two other instructions, each of a different respective one of the first instruction type or the second instruction type, targeting a same memory address.

13. The method of claim 8, further comprising:
providing a tagged load instruction to a load buffer;
providing a tagged store instruction to a store buffer;
determining that a first tagged instruction at the load buffer comprises a third load instruction and a first tag;
determining that a first tagged instruction at the store buffer comprises a third store instruction and a second tag;

where neither the first tag nor the second tag is equal to a color, and the first tag is equal to the second tag, executing the third load instruction after the third store instruction; and where neither the first tag nor the second tag is equal to the color, and the first tag is not equal to the second tag, executing the third load instruction before the third store instruction.

14. The method of claim 13, wherein the third load instruction is of a third instruction type; and where the first tag or the second tag is equal to the color, determining an order of execution of the third load instruction and the third store instruction based on a count of good bypass prevention decisions which are each based on a respective instruction of a third instruction type.

15. A system comprising:

a processor, comprising:

manager circuitry to:

detect an address collision event wherein a memory address is targeted by both a first load instruction of a first instruction type and a first store instruction of a second instruction type, wherein the first instruction type and the second instruction type correspond to different respective instruction pointer values; and determine, based on the address collision event, a count of decisions each to forego a reversal of an order of execution of a respective instruction of the first instruction type and a respective instruction of the second instruction type;

classification circuitry to perform an evaluation of the count based on a threshold maximum count value; and prediction circuitry, coupled to the classification circuitry, to generate, based on the evaluation, a signal to determine an order of execution of a second load instruction of the first instruction type and a second store instruction of the second instruction type; and a display device coupled to the processor, the display device to display an image based on the second load instruction and the second store instruction.

16. The system of claim 15, wherein the first instruction type is to correspond to a first instruction pointer value, and the second instruction type is to correspond to a second instruction pointer value, and wherein:

the manager circuitry is further to provide reference information, based on the address collision event, to indicate an assignment of a color to both the first instruction type and the second instruction type;

the classification circuitry is further to:

identify the first instruction type and the second instruction type based on the second load instruction and the second store instruction, respectively; and access the reference information, based on the first instruction type and the second instruction type, to detect the assignment.

17. The system of claim 16, wherein the classification circuitry is further to:

tag the second load instruction, based on the assignment and the evaluation, with one of a first color or a second color to generate a first tagged instruction; and tag the second store instruction with the first color, based on the assignment, to generate a second tagged instruction.

18. The system of claim 17, the processor further comprising:

counter circuitry to maintain a count of good bypass prevention decisions which are each based on a respective instruction of the first instruction type;

wherein the prediction circuitry is to determine, based on the one of the first color or the second color, whether the order of execution of the second load instruction and the second store instruction is to be independent of the count of good bypass prevention decisions.

19. The system of claim 15, wherein the manager circuitry is to:

increment the count based on an instance of two instructions, each of a different respective one of the first instruction type or the second instruction type, which target different respective memory addresses; and reset the count to a baseline value based on an instance of two other instructions, each of a different respective one of the first instruction type or the second instruction type, which target a same memory address.

20. The system of claim 15, wherein the classification circuitry is further to:

provide a tagged load instruction to a load buffer;

provide a tagged store instruction to a store buffer;

wherein the prediction circuitry is to:

determine that a first tagged instruction at the load buffer comprises a third load instruction and a first tag;

determine that a first tagged instruction at the store buffer comprises a third store instruction and a second tag;

wherein:

where neither the first tag nor the second tag is equal to a color, and the first tag is equal to the second tag, the processor is to execute the third load instruction after the third store instruction; and where neither the first tag nor the second tag is equal to the color, and the first tag is not equal to the second tag, the processor is to execute the third load instruction before the third store instruction.

* * * * *